(12) United States Patent  (10) Patent No.: US 8,677,489 B2
Strebe et al. (45) Date of Patent: Mar. 18, 2014

(54) METHODS AND APPARATUS FOR MANAGING NETWORK TRAFFIC

(71) Applicant: L-3 Communications Corporation, New York, NY (US)

(72) Inventors: Matthew Strebe, Cardiff, CA (US); Timothy C. Collins, Carlsbad, CA (US); Nathan V. Whittenton, Carlsbad, CA (US)

(73) Assignee: L3 Communications Corporation, New York, NY (US)

( * ) Notice: Subject to any disclaimer, the term of this patent is extended or adjusted under 35 U.S.C. 154(b) by 0 days.

(21) Appl. No.: 13/748,297

(22) Filed: Jan. 23, 2013

(65) Prior Publication Data

US 2013/0152187 A1   Jun. 13, 2013

Related U.S. Application Data

(60) Provisional application No. 61/590,279, filed on Jan. 24, 2012.

(51) Int. Cl.
*H04L 29/06* (2006.01)

(52) U.S. Cl.
USPC ............... 726/23; 726/22; 713/150; 713/153

(58) Field of Classification Search
USPC ............................. 726/23, 22; 713/150, 153
See application file for complete search history.

(56) References Cited

U.S. PATENT DOCUMENTS

| | | | |
|---|---|---|---|
| 6,789,203 B1 * | 9/2004 | Belissent ...................... | 726/22 |
| 7,028,179 B2 | 4/2006 | Anderson et al. | |
| 7,254,713 B2 * | 8/2007 | D'Souza ...................... | 713/182 |
| 7,584,507 B1 * | 9/2009 | Nucci ............................ | 726/23 |
| 7,634,813 B2 | 12/2009 | Costa et al. | |
| 7,669,241 B2 * | 2/2010 | Ganguly et al. .............. | 726/22 |
| 7,694,338 B1 * | 4/2010 | Jafari et al. ................... | 726/22 |
| 7,779,471 B2 * | 8/2010 | Balasubramaniyan et al. | 726/23 |
| 7,797,738 B1 * | 9/2010 | Spatscheck et al. ......... | 726/13 |
| 7,882,556 B2 * | 2/2011 | Ahn et al. ..................... | 726/13 |
| 7,921,462 B2 * | 4/2011 | Rooney et al. ............... | 726/23 |
| 8,091,132 B2 * | 1/2012 | Ansari et al. ................. | 726/23 |
| 8,180,032 B2 * | 5/2012 | Yasrebi et al. ............... | 379/189 |

(Continued)

OTHER PUBLICATIONS

Cisco Systems, Inc., "Defeating DDoS Attacks", White Paper, pp. 1-11, 2004.

(Continued)

*Primary Examiner* — Bradley Holder
(74) *Attorney, Agent, or Firm* — Knobbe Martens Olson & Bear LLP

(57) ABSTRACT

Methods, apparatus, and computer readable storage media reduce or eliminate network traffic meeting criteria. In some aspects, network traffic transmitted by one or more source nodes to one or more destination nodes may comprise a denial of service attack against the destination node(s). At least a portion of the denial of service attack traffic may be reduced or eliminated with the disclosed methods and apparatus. In one aspect, a method of managing undesirable network traffic transmitted from a source node to a destination node over a communications network includes receiving a notification of a routing rule change, authenticating the notification, determining a network routing rule based on the notification, applying the network routing rule, determining a network path toward the source node, determining an entity based on the network path, and transmitting a notification of the routing rule change to the entity.

15 Claims, 12 Drawing Sheets

(56) References Cited

U.S. PATENT DOCUMENTS

| | | | |
|---|---|---|---|
| 8,181,240 B2* | 5/2012 | Jonnala et al. | 726/15 |
| 8,205,253 B2* | 6/2012 | Spatscheck et al. | 726/13 |
| 8,225,399 B1* | 7/2012 | Van Der Merwe | 726/23 |
| 8,230,504 B1* | 7/2012 | Jafari et al. | 726/22 |
| 8,248,946 B2* | 8/2012 | Chao et al. | 370/235.1 |
| 8,272,044 B2* | 9/2012 | Ansari et al. | 726/13 |
| 8,302,186 B2* | 10/2012 | Ormazabal et al. | 726/22 |
| 8,359,648 B2* | 1/2013 | Kim | 726/22 |
| 8,370,937 B2* | 2/2013 | Gal et al. | 726/23 |
| 8,392,991 B2* | 3/2013 | Ansari et al. | 726/23 |
| 2002/0120853 A1* | 8/2002 | Tyree | 713/188 |
| 2003/0014665 A1* | 1/2003 | Anderson et al. | 713/201 |
| 2004/0015579 A1* | 1/2004 | Cooper et al. | 709/223 |
| 2004/0042470 A1* | 3/2004 | Cooper et al. | 370/401 |
| 2004/0143670 A1* | 7/2004 | Roychowdhury et al. | 709/229 |
| 2004/0205210 A1* | 10/2004 | Hamano | 709/230 |
| 2005/0060573 A1* | 3/2005 | D'Souza | 713/201 |
| 2005/0144441 A1* | 6/2005 | Govindarajan | 713/160 |
| 2006/0010389 A1* | 1/2006 | Rooney et al. | 715/736 |
| 2006/0041667 A1* | 2/2006 | Ahn et al. | 709/229 |
| 2006/0075489 A1* | 4/2006 | Ganguly et al. | 726/22 |
| 2006/0107318 A1* | 5/2006 | Jeffries et al. | 726/22 |
| 2006/0225133 A1* | 10/2006 | Balasubramaniyan et al. | 726/22 |
| 2006/0280121 A1* | 12/2006 | Matoba | 370/235 |
| 2006/0282892 A1* | 12/2006 | Jonnala et al. | 726/23 |
| 2007/0083927 A1* | 4/2007 | Swaroop | 726/22 |
| 2007/0107059 A1 | 5/2007 | Chasin et al. | |
| 2007/0130619 A1* | 6/2007 | Reams, III | 726/13 |
| 2007/0147376 A1* | 6/2007 | Perlman et al. | 370/392 |
| 2007/0157300 A1* | 7/2007 | Sivaradjane et al. | 726/9 |
| 2007/0209068 A1* | 9/2007 | Ansari et al. | 726/13 |
| 2007/0234417 A1 | 10/2007 | Blakley, III et al. | |
| 2007/0280114 A1* | 12/2007 | Chao et al. | 370/235.1 |
| 2008/0127324 A1* | 5/2008 | Seo et al. | 726/13 |
| 2008/0127349 A1* | 5/2008 | Ormazabal et al. | 726/25 |
| 2008/0222724 A1* | 9/2008 | Ormazabal et al. | 726/23 |
| 2008/0235755 A1 | 9/2008 | Blaisdell et al. | |
| 2008/0271146 A1* | 10/2008 | Rooney et al. | 726/23 |
| 2008/0295175 A1* | 11/2008 | Ansari et al. | 726/23 |
| 2008/0320585 A1* | 12/2008 | Ansari et al. | 726/13 |
| 2009/0006841 A1* | 1/2009 | Ormazabal et al. | 713/152 |
| 2009/0013404 A1* | 1/2009 | Chow et al. | 726/22 |
| 2009/0144806 A1* | 6/2009 | Gal et al. | 726/3 |
| 2009/0285120 A1 | 11/2009 | Swan | |
| 2010/0058471 A1* | 3/2010 | Kim | 726/22 |
| 2010/0071062 A1* | 3/2010 | Choyi et al. | 726/23 |
| 2010/0138921 A1* | 6/2010 | Na et al. | 726/22 |
| 2011/0099203 A1 | 4/2011 | Fastring | |
| 2011/0099622 A1* | 4/2011 | Lee et al. | 726/13 |
| 2011/0107412 A1* | 5/2011 | Lee et al. | 726/11 |
| 2011/0138463 A1* | 6/2011 | Kim et al. | 726/22 |
| 2011/0214177 A1* | 9/2011 | Spatscheck et al. | 726/22 |
| 2011/0238997 A1* | 9/2011 | Bellur et al. | 713/176 |
| 2012/0036179 A1* | 2/2012 | Hegde et al. | 709/203 |
| 2012/0054823 A1* | 3/2012 | Kim | 726/1 |
| 2012/0075314 A1* | 3/2012 | Malakapalli et al. | 345/522 |
| 2012/0079592 A1* | 3/2012 | Pandrangi | 726/22 |
| 2012/0124666 A1* | 5/2012 | Kim et al. | 726/23 |
| 2012/0144023 A1 | 6/2012 | Guest et al. | |
| 2012/0151583 A1* | 6/2012 | Kang et al. | 726/23 |
| 2012/0155274 A1* | 6/2012 | Wang et al. | 370/236 |
| 2012/0174196 A1* | 7/2012 | Bhogavilli et al. | 726/5 |
| 2012/0210421 A1* | 8/2012 | Ormazabal et al. | 726/22 |

OTHER PUBLICATIONS

Greenhalgh et al., "Using Routing and Tunneling to Combat DoS Attacks", USENIX SRUTO '05 Technical Paper, pp. 1-8, 2005.

Lo et al., "A Cooperative Intrusion Detection System Framework for Cloud Computing Networks", 2010 $39^{th}$ International Conference on Parallel Processing Workshops, IEEE Computer Society, pp. 281-284, 2010.

Modi et al., "A survey of intrusion detection techniques in Cloud", Journal of Network and Computer Applications, vol. 36, pp. 42-57, 2013.

Oikonomou et al., "A Framework for a Collaborative DDoS Defense", Proceedings of the 2006 Annual Computer Security Applications Conference (ACSAS 22), pp. 1-10, Dec. 2006.

Zander et al., "Design of Diffuse v0.4—Distributed Firewall and Flow-shaper Using Statistical Evidence", CAIA Technical Report 110704A, pp. 1-25, Jul. 2011.

International Search Report and Written Opinion mailed on May 31, 2013 for International application No. PCT/US13/22773.

* cited by examiner

METHODS AND APPARATUS FOR MANAGING NETWORK TRAFFIC

CROSS-REFERENCE TO RELATED APPLICATIONS

The disclosure claims priority to U.S. Provisional Patent Application No. 61/590,279 filed on Jan. 24, 2012, entitled "METHODS AND APPARATUS FOR MANAGING NETWORK TRAFFIC," and is considered part of this application, and is hereby incorporated by reference in its entirety.

TECHNICAL FIELD

This disclosure relates to managing traffic on a computer network. Specifically, the disclosure relates to reducing undesired network traffic from a source node to a destination node.

DESCRIPTION OF THE RELATED TECHNOLOGY

With unprecedented rapidity, the Internet has become indispensable to the operation of the modern economy. In the decade between 1996 and 2006, a high percentage of businesses and government entities, along with an estimated one sixth ($1/6^{th}$) of the world's population gained access to an internet connection.

The internet consists of many interconnected networks. Much of the communication between these networks utilizes the Internet Protocols. The Internet Protocols were designed to be robust and efficient. One of the original design considerations of the Internet Protocols was to provide reliable communication in a military network. Since a military network may be expected to experience the loss of some components, especially during war time, the protocols were designed to handle these contingencies. For example, these protocols make multiple attempts to efficiently deliver data, and route around failures.

The Internet Protocols were also designed before the global significance they have today was fully understood. Additionally, these protocols were developed to consume only the computing resources that were economically available in the 1970's. Despite this, the track record of the Internet Protocols in providing a reliable network has generally been good. Reliability problems of the Internet have generally been manageable, and have never impacted the entire Internet in one event or even a significant portion thereof.

The resiliency designed into the Internet Protocols may have contributed to the ability of some to commit crime, fraud, and directed attacks against the computing assets of others that can be both impractical to trace and difficult to stop. The reliability and resilience of the Internet Protocol may have contributed to the difficulty in managing these malicious acts.

In 2010 for example, some reports indicate that 90% of all email traffic is spam, and 50% of HTTP transmissions consist of advertising. Random port scanning (the traffic of hackers and worms looking for vulnerable hosts) contributes to a constant "background radiation" of traffic on the Internet. Some reports indicate that on average, more than half of all traffic arriving at the firewall of a typical business is useless or malicious.

The specter of cyber-warfare, or the directed large-scale assault on the economic systems of an enemy, looms large. No single entity controls the Internet, and it may be difficult for any government or agency to possess the technical capability necessary to prevent Internet attacks that at a minimum will consume bandwidth. Directed, all-out cyber warfare between nations has the potential to impact national or world economies by creating a lack of trust in financial systems. For example, if an attack were able to target a single large bank and obtain financial information, some loss of trust may occur. If this activity became commonplace, severe economic impact could occur until the trust was restored.

Current Protections

Firewalls may be used to stop directed attacks at a connection point between a less trusted network and a more trusted network. For example, a business may use a firewall to protect its private trusted network from the Internet. Firewalls block network traffic from passing through them unless the network traffic is permitted by the firewall policies. These firewall policies may be established based on many parameters, including the business functions of the network being protected by the firewall, and the types of applications that need to communicate between the untrusted network and the more trusted network the firewall protects.

Firewalls may provide protection to applications inside the firewall such that each individual application does not necessarily need to be designed to be secure against attack. With this approach, legacy applications may not need to be redesigned to be secure. Firewalls play a role in a "layered" security response which can help to achieve real-world deploy-ability.

Application layer filters such as spam filters and web content filters may remove malicious traffic from streams that are allowed to pass through firewalls. These higher level filters may be configured by policy to block certain types of network traffic based on an application data portion of network packets, rather than by the network layer portion of the packet.

Today, firewalls and application layer filters may drop content that is not allowed by their policies. Firewalls and application layer filters generally may not provide a mechanism to report unwanted content to any higher authority that can prevent the reception of the traffic in an automated fashion.

Remaining Threats

Malicious or unwanted traffic is reliably delivered from its source to the firewall by the Internet Protocols running on a network. In some cases, the network is the Internet. Although a firewall may drop the malicious or unwanted traffic, processing this traffic consumes network bandwidth and processing capacity on the firewall. Denial-of-service attacks attempt to exploit this resource consumption and may direct a large number of compromised computers to generate network traffic to a specific destination. The large amount of network traffic generated may consume a significant percentage of the bandwidth capacity for the network paths used by the traffic. While this network load may be distributed at places far from the destination node, as the traffic converges toward the destination the malicious traffic may consume a larger and larger percentage of the available capacity of the network resources closer to the destination node. In attempting to manage the high volume of traffic, the destination node's network connection may cease to function properly as a result of the load. This may prevent at least the targeted destination from utilizing the internet. Nodes with internet connections that share some of the same network resources, for example, routers, switches, repeaters, and cables, etc. may also experience degradation in network service.

Researchers continue their efforts to improve the situation. In the meantime, it has been reported that criminal hacking gangs extort millions of dollars per year from businesses using the threat of DDOS attacks. These attacks could potentially prevent the businesses from utilizing their Internet connectivity. Reports are that activist hackers also direct DDOS attacks against their ideological enemies. It is has also been reported that governments are developing the capability to use DDOS and other attacks to cripple their opponents as a component of war.

Undesirable network traffic may also include spam email. While mail servers may include spam detection software to filter out spam, the spam network messages may be delivered all the way to their destination before this filtering occurs. Some estimate that 90% of email traffic on the Internet is spam email. Therefore, Spam activity may also represent a significant waste of network resources.

Routing

Data on the Internet is delivered in the form of packets. The Internet Protocol defines a data exchange between nodes and network devices of a network. The protocol defines how a portion of the data of each packet should be interpreted. This portion is referred to as a packet header, in this case, the Internet Protocol (IP) header. The IP header includes several fields, including a field for the address of a node that sent the packet (the source address) and an address of a node that is the ultimate destination of the packet (the destination address). The original sender of the packet initializes the address fields with the sender's and receiver's IP address.

After a packet is initially transmitted onto a network by the source node, it may be received by a network device such as a router. Routers are network devices that route network packets from their source to their destination. For example, a router may include a plurality of network interfaces. When a packet is received on one network interface, the router may examine the destination address specified in the packet. It may then search its configuration tables to determine how a packet with this particular destination address should be routed. Based on its tables, it may determine that the packet should be forwarded over another one of its network interfaces, for example, a second network interface. The router may then forward the packet over the second network interface.

After the router forwards the packet, it may be received by the destination node itself, or it may be received by another router. If received by another router, this new router may perform a similar process as described above. This process will repeat, with the packet moving from one router to another, until the packet reaches the destination address specified in its packet header.

Therefore, the IP protocol provides services that deliver the packet from a source address to a destination address. Once that packet has been delivered to its destination, other data within the packet may be utilized by other protocols. For example, some IP packets may be sent and received by the UDP protocol. The UDP protocol defines how the contents of a portion of a packet will be interpreted. This portion is known as the UDP header. Because multiple applications on one computer may utilize the UDP protocol simultaneously, one field in the UDP header identifies which application the packet is destined for. This field is called a service port. The UDP protocol is considered a datagram protocol, in that it does not provide guaranteed delivery of packets to a remote destination.

Some other IP packets may be sent and received by the TCP protocol. TCP is a connection oriented protocol that, once a connection is established, guarantees delivery of data to a remote destination as long as the connection remains open. TCP provides this guarantee through the use of packet acknowledgements and retransmissions. For various reasons relating to routing and traffic management on the Internet, packets may not be received by a node's network interface or IP protocol layer in the order they were sent. The TCP protocol may reorder packets at the receiving node so they are delivered to a receiving application in the order sent by a sending application.

Both the TCP and UDP protocols may deliver application level data between two nodes on a network. For example, the data for many web pages is provided by the HTTP protocol, which is an application layer protocol that may use TCP to deliver the data between a web server and a client application such as a browser.

Many other protocols are also used on networks such as the Internet. For example, control protocols may be used between network devices such as routers, switches, and gateways to exchange routing information. Some other protocols are used to map an address at one protocol layer to an address at another protocol layer. For example, the ARP protocol maps from an IP address to a station address such as an Ethernet address. Other protocols such as the DNS protocol map from a node name to an IP address.

Routing information protocols may allow routers to communicate their knowledge of recipient locations to other network devices such as routers, gateways, or switches. For example, if a router receives a packet with a destination address, and routing information for that address cannot be found in its configuration tables, the router may send a control message back to the source indicating that the message is undeliverable.

Routers generally may not examine data of the packets they receive and forward beyond data pertaining directly to their routing functions. For example, a typical IP packet includes a source address and a destination address in the IP packet header. A router may examine a packet's IP header to determine the source address and destination address of the packet. However, the router may not examine additional data such as the packet's TCP header (if it exists) or UDP header (if it exists in the packet). Nor will a router typically examine higher level application data. For example, a TCP packet may also include http protocol information, and the contents of a web page. A router will typically not examine this information, again primarily focusing instead on the packet's source and destination address. There are some exceptions to this. For example, some routers may include embedded http servers to provide a configuration interface for the router. In this case, the router may itself be able to accept TCP connections and then exchange http data with a browser application for example. However, this router functionality may not represent a primarily router function.

Note that there may be several network devices between a source node and a destination node. Devices closer to the source node may be considered to be "upstream" devices relative to devices closer to the destination, which may be considered to be "downstream" devices. Note that this term is relative to the direction of traffic being referenced. For example, when traffic is sent from node a to node b, a device close to node b is considered a downstream node relative to a device that is closer to node a. However, when referencing traffic send from node b to node a, that same device that is close to node b may be considered an upstream device relative to a device closer to node a.

An autonomous system (AS) may describe any network under single administration, such as those administered by a single Internet Service Provider (ISP). An AS may be maintained by a telecom company, a subscriber to a cable company, a pure ISP, a search engine or website operator, or any other type of network connected to the Internet. An Autonomous System is within the control of a distinct entity. Each operator of an AS may have their own internal intrusion detection and malicious traffic squelching techniques is place, but these techniques are proprietary and do not transmit information about attacks to other ISPs involved in routing traffic. With current solutions, when a firewall or other node maintained within one particular AS determines that it is currently receiving undesirable network traffic, it does not have a standardized method of notifying any AS upstream of the undesirable traffic that it need not deliver the undesirable traffic to it. Instead, an upstream AS network may continue to forward the undesirable network traffic to the AS. This is especially true when the AS network is under a denial of service attack, potentially rendering bidirectional communication with the AS network difficult or impossible.

SUMMARY

The systems, methods and devices of the disclosure each have several innovative aspects, no single one of which is solely responsible for the desirable attributes disclosed herein.

One innovative aspect of the subject matter described in this disclosure can be implemented in a method of managing undesirable network traffic transmitted from a source node to a destination node over a communications network. The method includes receiving a notification of a routing rule change, authenticating the notification, determining a network routing rule based on the notification, applying the network routing rule, determining a network path toward the source node, determining an entity based on the network path, and transmitting a notification of the routing rule change to the entity. In some implementations, the network routing rule governs network traffic between the source and destination node. In some implementations, authenticating the notification includes determining a network entity indicated by the notification, determining a network address of a node assigned to maintain network routing rules for the network entity based on public data, and querying the node for a routing rule set for the network entity based on the network address. In some aspects, the public data is public DNS data.

In some implementations, authenticating the notification comprises successfully decrypting data indicated by the notification. In some implementations, determining a network routing rule based on the notification includes determining the network routing rule from decrypted data indicated by the notification. In some implementations, determining a network path includes performing ICMP source routing. In some implementations, determining a network path includes performing a reverse DNS lookup. In some implementations, the notification is received by a second entity, and determining a network path is based on routing tables maintained by the second entity. In some implementations, determining a network path is based, at least in part, on a log of packets transmitted or received over a particular network interface. In some implementations, determining an entity based on the network path includes determining a node on the network path, and determining a second node assigned to maintain network routing rules for the node, wherein the second node is maintained by the entity.

Another aspect disclosed is an apparatus for managing undesirable network traffic transmitted from a source node to a destination node over a communications network. The apparatus includes one or more processors, and one or more memories, operably coupled to the one or more processors, with the one or more processors configured to fetch instructions from the one or more memories, and the one or more memories configured to store a notification module configured to receive a notification of a routing rule change, an authentication module configured to authenticate the notification, a rule module configured to determine a network routing rule based on the notification, a router control module configured to apply the network routing rule, a network path determination module, configured to determine a network path toward the source node, an entity determination module, configured to determine an entity based on the network path, and an entity notification module, configured to transmit a notification of the routing rule change to the entity.

In some implementations, the authentication module is configured to authenticate the notification by determining a network entity indicated by the notification, determining a network address of a node assigned to maintain network routing rules for the network entity based on public data, and querying the node for a routing rule set for the network entity based on the network address. In some implementations, the public data is public DNS data.

Another aspect disclosed is an apparatus for managing undesirable network traffic transmitted from a source node to a destination node over a communications network. The apparatus includes means for receiving a notification of a routing rule change, means for authenticating the notification, means for determining a network routing rule based on the notification, means for applying the network routing rule, means for determining a network path toward the source node, means for determining an entity based on the network path, and means for transmitting a notification of the routing rule change to the entity.

In some implementations, the means for authenticating is configured to authenticate the notification by determining a network entity indicated by the notification, determining a network address of a node assigned to maintain network routing rules for the network entity based on public data, and querying the node for a routing rule set for the network entity based on the network address. In some implementations, the public data is public DNS data.

Another aspect disclosed is a non-transitory, computer readable medium storing instructions that when executed by a processor cause it to perform a method for managing undesirable network traffic transmitted from a source node to a destination node over a communications network. The method includes receiving a notification of a routing rule change, authenticating the notification, determining a network routing rule based on the notification, applying the network routing rule, determining a network path toward the source node, determining an entity based on the network path, and transmitting a notification of the routing rule change to the entity.

In some implementations, authenticating the notification further includes determining a network entity indicated by the notification, determining a network address of a node assigned to maintain network routing rules for the network entity based on public data, and querying the node for a routing rule set for the network entity based on the network address. In some implementations, the public data is public DNS data.

Another aspect disclosed is a method of authenticating an assertion by a source in an environment of distributed control. The method includes receiving a notification of the assertion, determining an entity responsible for maintaining an authenticated list of assertions by the source based on a first trusted public record, determining an assertion authenticator for the entity based on a second trusted public record, determining one or more assertions of the source from the assertion authenticator, and authenticating the assertion based on the determined one or more assertions.

In some implementations, determining an entity responsible for maintaining an authenticated list of assertions by the source is further based on a network address associated with the source. In some implementations, the first public record is a public reverse DNS entry. In some implementations, the second public record is a public DNS entry. In some implementations, determining via a public record an entity responsible for maintaining an authenticated list of assertions by the source includes determining a source network address indicated by the notification, and determining a hostname based on the source network address. In some implementations, determining a hostname includes performing a reverse DNS lookup based on the source network address. In some implementations, determining an assertion authenticator for the entity comprises performing a DNS lookup based on the hostname.

Another aspect disclosed is an apparatus for authenticating an assertion by a source. The apparatus includes a notification module configured to receive a notification of the assertion, an entity determining module, configured to determine an entity responsible for maintaining an authenticated list of assertions by the source based on a first trusted public record, an assertion authenticator determination module, configured to determine an assertion authenticator for the entity based on a second trusted public record, an assertion determining module, configured to determine zero or more assertions of the source from the assertion authenticator, and an assertion authentication module, configured to authenticate the assertion based on the assertions of the source from the assertion authenticator. In some aspects, the first public record is a public reverse DNS entry. In some aspects, the second public record is a public DNS entry.

Another aspect disclosed is an apparatus for authenticating an assertion by a source. The apparatus includes means for receiving a notification of the assertion, means for determining an entity responsible for maintaining an authenticated list of assertions by the source based on a first trusted public record, means for determining an assertion authenticator for the entity based on a second trusted public record, means for determining one or more assertions of the source from the assertion authenticator, and means for authenticating the assertion based on the assertions of the source from the assertion authenticator.

In some implementations, the first public record is a public reverse DNS entry. In some implementations, the second public record is a public DNS entry. In some implementations, the means for determining via a public record an entity responsible for maintaining an authenticated list of assertions by the source is configured to determine a source network address indicated by the notification, and determine a hostname based on the source network address. In some implementations, the means for determining via a public record an entity responsible for maintaining an authenticated list of assertions by the source is configured to determine a hostname by performing a reverse DNS lookup based on the source network address. In some implementations, the means for determining an assertion authenticator for the entity is configured to perform a DNS lookup based on the hostname to obtain a network address of an assertion authenticator.

Another aspect disclosed is a non-transitory computer readable medium comprising instructions that when executed by a processor cause it to perform a method for authenticating an assertion by a source. The method includes receiving a notification of the assertion, determining an entity responsible for maintaining an authenticated list of assertions by the source based on a first trusted public record, determining an assertion authenticator for the entity based on a second trusted public record, determining one or more assertions of the source from the assertion authenticator, and authenticating the assertion based on the determined one or more assertions. In some aspects, the first public record is a public reverse DNS entry. In some aspects, the second public record is a public DNS entry.

Another aspect disclosed is a method of authenticating a routing rule change by an originator in an environment of distributed control. The method includes receiving a notification that an originator changed a routing rule for network traffic from a source node, determining an entity responsible for maintaining an authenticated list of routing rules for the originator based on a first trusted public record, determining an authenticated routing rule provider for the entity based on a second trusted public record, determining zero or more routing rules of the originator from the authenticated routing rule provider, and authenticating the routing rule change based on the determined zero or more routing rules. In some implementations, the first public record is a public reverse DNS entry. In some implementations, the second public record is a public DNS entry.

In some implementations, determining an entity responsible for maintaining an authenticated list of routing rules for the originator based on a first public record includes determining a source network address indicated by the notification, and determining an entity identifier from the first public record based on the source network address. In some aspects, determining an entity identifier comprises performing a reverse DNS lookup based on the source network address. In some aspects, determining an authenticated routing rule provider for the entity comprises performing a DNS lookup based on the entity identifier. Some aspects of the method also include determining a network path toward the source node, determining a second entity based on the network path, and transmitting a notification of the routing rule change to the second entity.

Some aspects of the method include applying the network routing rule change. In some aspects, determining a second entity based on the network path includes determining a network address of a node on the network path, and determining a second entity identifier from a third public record based on the network address. In some aspects, the method also includes determining a second network address from a fourth public record based on the second entity identifier, wherein the second network address corresponds to a network node assigned to maintain network routing rules for the node on the network path, wherein a node having the second network address is associated with the entity. In some aspects, transmitting a notification of the routing rule change to the second entity comprises transmitting the notification to the second network address.

Another aspect disclosed is an apparatus for authenticating an assertion by a source in an environment of distributed control. The apparatus includes one or more processors, and one or more memories, operably coupled to the one or more processors, wherein the one or more processors are configured to fetch instructions from the one or more memories, and the one or more memories are configured to store a notification module, configured to receive a notification that an originator changed a routing rule for network traffic from a source node, an entity determining module, configured to determine an entity responsible for maintaining an authenticated list of routing rules for the originator based on a first trusted public record, an assertion authenticator determination module, configured to determine an authenticated routing rule provider for the entity based on a second trusted public record, an assertion determining module, configured to determine zero or more routing rules of the originator from the authenticated routing rule provider, and an assertion authentication module, configured to authenticate the routing rule change based on the determined zero or more routing rules.

In some aspects, the entity determining module is further configured to determine an entity responsible for maintaining an authenticated list of routing rules for the originator based on a first public record by, at least in part determining a source network address indicated by the notification, and determining an entity identifier from the first public record based on the source network address.

Another aspect disclosed is an apparatus for authenticating a routing rule change by an originator in an environment of distributed control. The apparatus includes means for receiving a notification that an originator changed a routing rule for network traffic from a source node, means for determining an entity responsible for maintaining an authenticated list of routing rules for the originator based on a first trusted public record, means for determining an authenticated routing rule provider for the entity based on a second trusted public record, means for determining zero or more routing rules of the originator from the authenticated routing rule provider, and means for authenticating the routing rule change based on the determined zero or more routing rules.

Some aspects of the apparatus further include means for determining a network path toward the source node, means for determining a second entity based on the network path, and means for transmitting a notification of the routing rule change to the second entity. In some implementations, the means for determining a second entity based on the network path is further configured to include a means for determining a network address of a node on the network path, and means for determining a second entity identifier from a third public record based on the network address. In some aspects, the apparatus further includes means for determining a second network address from a fourth public record based on the second entity identifier, wherein the second network address corresponds to a network node assigned to maintain network routing rules for the node on the network path, wherein a node having the second network address is associated with the entity.

Another aspect disclosed is a non-transitory computer readable storage medium comprising instructions that when executed by a processor cause it to perform a method for authenticating a notification of a routing rule change by an originator in an environment of distributed control. The method includes receiving a notification that an originator changed a routing rule for network traffic from a source node, determining an entity responsible for maintaining an authenticated list of routing rules for the originator based on a first trusted public record, determining an authenticated routing rule provider for the entity based on a second trusted public record, determining zero or more routing rules of the originator from the authenticated routing rule provider, and authenticating the routing rule change based on the determined zero or more routing rules.

DETAILED DESCRIPTION

Figure 1:
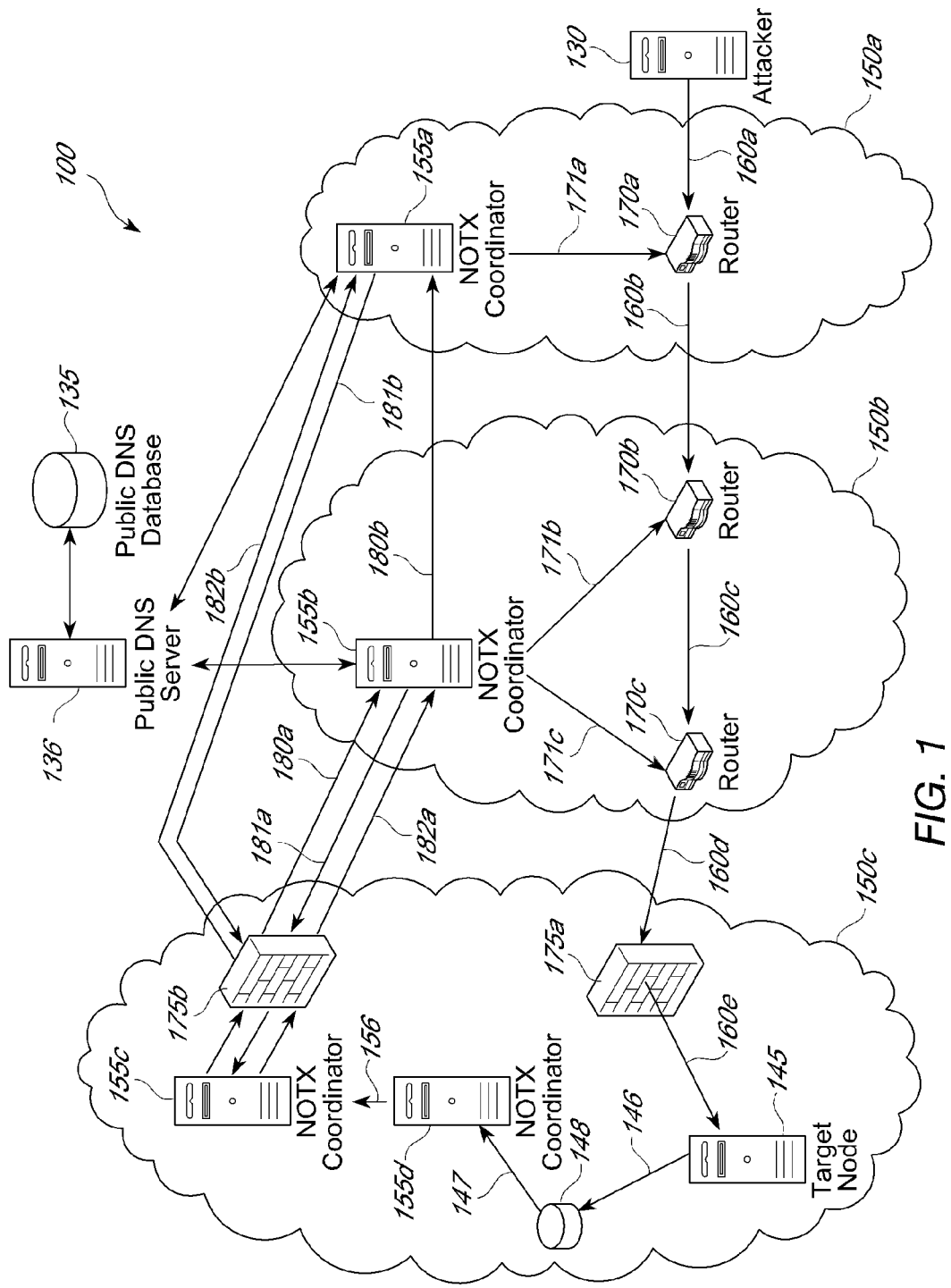
FIG. 1 is an overview diagram illustrating one implementation of NOTX.

A computer or node operating on a network such as the Internet may receive data it deems to be undesirable. To prevent future reception of additional undesirable data, for example, from the same source node, few options are available. While the node can drop the undesirable data at the firewall, this occurs after substantial network and processing resources have already been consumed.

The methods and apparatus disclosed provide for a unified solution referred to as NOTX. NOTX may comprise multiple software services. These services may include:

- A firewall rule publishing protocol designed to enable ISPs to read and exchange a client's routing rules to provide firewalling capability on behalf of their clients.
- A triggering protocol designed to survive and work through a denial of service attack. This triggering protocol can inform ISPs that a particular customer is experiencing a denial of service attack.
- An intrusion detection aggregator that receives events from an existing intrusion detection system, anti-malware applications and appliances, firewalls, and public hosts.
- A policy application engine to apply a response to received events.
- Drivers to apply changes to various routers, firewalls, and network appliances through an enterprise to implement NOTX policies.

NOTX may provide these capabilities without major structural changes to Internet infrastructure. NOTX may also be implemented with existing equipment and software, and without presuming a trust relationship between network operators or the availability of authentication that is typically difficult to coordinate across independent organizations.

Some NOTX implementations may further include the following aspects:

- A NOTX protocol, which provides network traffic blocking policies implemented by end-user networks to Internet Service Providers (ISPs) across the Internet and triggers ISPs to read and implement those policies. These blocking policies may be in the form of filtering and/or routing rules for network traffic matching particular criteria.
- Filtering Routes. Filtering routes are network pathways through an associated service network that include standard firewalls rather than typical routers to forward traffic. Filtering routes are configured as secondary network paths through an associated service network which may provide for greater control and screening of traffic flowing through the network pathways than a typical network path that utilizes only routers to forward traffic.

Security Sensors. Security sensors detect malicious or nuisance traffic. Examples include spam filters, Intrusion Detection Systems (IDS), Anti-Virus and malware detectors, human administrators, Intellectual Property theft detectors, and system log aggregators. The specialized security software may be designed to detect undesired network traffic. The specialized security software may apply application specific domain knowledge to make determinations about which traffic is desirable and which traffic is not. For example, an email program may employ sophisticated spam email detection technology. Once spam email has been determined, the email program may send a NOTX rejection notice message requesting that no more traffic be received from the source address matching the source of the spam email. Similarly, virus detection software may monitor network data as it arrives on a computer. Upon detection of a virus, the virus software may initiate a NOTX rejection notice, indicating that no more data from the computer that sent the data including the virus be forwarded.

NOTX Coordinators. NOTX Coordinators may receive alerts from security sensors, apply policy decisions, create rules for filters, and publish those rules to other coordinators. In some embodiments, a NOTX coordinator may be a standard server running customized software that implements the NOTX protocol and coordinates threat detection and response activities internally on private networks. In some other embodiments, a NOTX coordinator may be implemented as a custom computing device, such as a special purpose or embedded appliance.

This architecture allows the domain knowledge of these applications to be applied to determine which network traffic is desired and not desired. Network devices such as routers may be more generally focused on the routing of traffic. These devices may not understand the application level domain. Instead, they focus more on selectively dropping traffic matching descriptions provided by the higher level applications.

NOTX support may also be included in end user applications such as anti-virus scanners, malware detectors, web browsers, and email clients. This may provide the ability for the end users to reduce data received from advertising networks, spam senders, and spyware.

NOTX Coordinators may be configured to receive alerts from various sensors in an Autonomous System (AS) network. These alerts may be generated based on simple threshold triggered conditions that have been programmed into the coordinator, such as "high volume of spam received from spambot.com", "port scan detected from evildoer.co.uk", or "extreme number of hits detected on www.ourcompany.com."

When a set of alerts matches a policy, the NOTX coordinator may create a blocking rule by using the information in the alerts. For example, "block all mail traffic from spambot.com" or "block all traffic from evildoer.co.uk". These blocking rules may then be programmed automatically into firewalls in some implementations.

After firewalls have been configured with the updated routing rules, a local network may be protected The attack traffic may still be arriving at one or more border firewalls, thereby consuming the bandwidth of the Internet circuits and limiting available bandwidth for access the Internet. Therefore, traffic may no longer be arriving at the target of the denial of service attack. However, because network access due to traffic at border files may be impacted, effects of the denial of service attack may still be perceived by users of the network.

To further mitigate the denial of service attack, the NOTX Coordinator may publish the blocking rules it has created to the various Internet Service Provider Autonomous Systems (ISP AS) that deliver traffic to the local network. The NOTX Coordinators owned by those ISPs may then evaluate the published block requests, apply their own policy to them, and potentially program their firewalls to block traffic on behalf of the end-user's local network. This may eliminate the transmission of malicious or nuisance traffic to the end-user.

A NOTX Coordinator may receive signals from local AS network sensors (using whatever protocol those sensors support, generally SNMP, Syslog, etc.), receive and verify NOTX requests from other NOTX coordinators to determine their validity, apply local AS NOTX policy to the received signals and requests to generate blocking orders, implement blocking orders by updating firewalls and routers (using protocols such as BGP, SSH, Telnet, OSPF, EIGRP, etc.) to filter or block the requested traffic, and determine a path towards the attacker node(s). In some implementations, ICMP messages are used to determine a path. A NOTX coordinator may also forward NOTX requests appropriately to other NOTX coordinators that are involved in the affected traffic streams.

In some implementations, NOTX coordinators may not be either sensors or filters. Instead, a NOTX coordinator may publish a blocking policy, and act as a policy switchboard to route blocking requests amongst Autonomous Systems networks. A NOTX coordinator may also communicate with sensors and filters in order to accomplish the requested blocking policies.

NOTX Coordinators may be designed to operate with sensors, firewalls, and routers using protocols such as SNMP, EIGRP, BGP, OSPF, and RIP. Autonomous system administrators may create connections between the various devices used in their AS Network and one or more NOTX coordinators to ensure that the NOTX coordinator can exercise the control it needs over the AS network.

Content providers, such as Google, Netflix, Facebook, Amazon, or Salesforce may implement a "Content Delivery Network" or CDN, and they are the source of a substantial amount of the legitimate traffic on the Internet. Internet Service Providers (or ISPs) such as AT&T, Level3, Cox, Time-Warner, Comcast, or Verio, implement networks designed to rapidly move traffic through their network to their end-user subscribers with as little latency as possible. End-user networks may subscribe to ISPs and CDNs, and their networks have a very typical geometry consisting of one or more links to an ISP. The links may be firewalled. These operators may also maintain a private network linking their various branch offices together.

All of these roles are Autonomous Systems (AS) in that they create their own policies for what traffic they want to allow onto their networks, but ISPs have very little actual control over what they route—they may be required to route pretty much everything.

One use of NOTX is to allow End-User Networks to publish their firewall blocking rules to ISPs to eliminate unwanted traffic before that traffic reaches the End-User Network. End-User Networks receive two primary benefits from NOTX: First, the NOTX Coordinator centralizes responses to Internet threats in real-time, tying together sensors and filters to create an immediate, policy-based response to changing conditions on the Internet. Additionally, the NOTX Protocol publishes blocking rules to ISPs to eliminate the use of bandwidth caused by malicious or nuisance traffic.

Internet Service Providers benefit from NOTX as it allows them to reduce the amount of useless or malicious traffic they carry, thus reducing their costs. ISPs are economically incentivized to implement NOTX to reduce their carrying costs. Content Delivery Networks are typically the source of traffic, and will not have substantial incentive to implement NOTX beyond the protection of their own network assets as an End-User Network.

When a sensor detects that the content of a message is not appropriate for the end-user based on the end-user's policies and preferences, it will generate an event. The event may be provided in many forms depending on the implementation. For example, in one implementation, a logging entry may be made using the Syslog protocol. Another implementation may send a Simple Network Management Protocol (SNMP) message. Another implementation may generate an alert by sending an email message. Another implementation may instead provide a user interface intended for human operators that implements a "dashboard," that includes the display of various statistics or parameters.

One or more NOTX coordinators may be configured to detect an event generated by a sensor. A NOTX coordinator appliance is a server (or cluster of servers, depending upon the scale required for the AS network) that coordinates NOTX messaging for an AS network. The NOTX coordinator validates NOTX requests according to the policies of the AS network, and once validated, adds them to its database of current routing rules.

A NOTX coordinator may receive sensor signals to generate blocking requests. In some implementations, a NOTX coordinator may utilize a protocol driver to interpret the contents of its sensor inputs using various protocols in order to generate a blocking signal. NOTX coordinators also receive NOTX requests from other NOTX coordinators. The requests indicate that a modification to traffic routing may be needed. Requests from other NOTX coordinators are validated using a number of means that will be discussed in more detail below.

NOTX Coordinators may also apply local policies or rules to each request from a NOTX Coordinator from another AS network to determine whether the request should be implemented. Examples of policies to be enforced could include whitelists indicating networks that NOTX coordinator will not block, originating NOTX coordinators that are untrusted and therefore ignored, sensor signals deemed too faint or inconsequential to act upon at this time, administrative overrides.

Once a request from a NOTX coordinator outside an AS network has been received and survived a policy check, the requests may be implemented by updating routing rules included in local network filters.

After implementing NOTX requests within its own local AS network, a NOTX coordinator may then determine an AS network that is along a network path between a network router and the malicious source. The NOTX coordinator may then send a NOTX message back to the various AS ISPs along the route indicating that the AS network should block traffic generated from the source address.

In some implementations a NOTX Coordinator for a local End-User Network is configured to publish its NOTX blocking rules to AS networks included in a configuration. In some implementations, the NOTX coordinator will perform a "Trace Route" operation to detect a list of ISP Autonomous Systems between itself and each malicious source. NOTX coordinators can use Trace Routes (ICMP Time-To-Live route detection) to find all the Autonomous Systems going back to a source. In cases where a source address is forged and is not equivalent to a network address of a node actually transmitting packets making up the denial of service attack, a trace route operation may reflect some inaccuracy. This path inaccuracy will occur relatively close to the source of the network traffic. However, a significant portion of the network path may be accurate, and NOTX coordinators along the portion of the network path that is accurate can facilitate blocking or rerouting of undesirable traffic. With the disclosed design, it is not necessary to discover the actual source of the undesirable traffic in order to provide effective blocking or rerouting of the undesirable network traffic comprising the denial of service attack. Additionally, the use of trace routing allows NOTX coordinators to "hop over" autonomous systems that are not NOTX compliant to transmit a request to every compliant AS in a routing path.

To facilitate the identification of AS networks along a network path to a malicious source, NOTX Coordinators may publish entries in a Reverse DNS database that include addresses for the IP addresses of routers within their control. The entries may provide a mapping from the IP addresses of one or more routers to an AS network identifier. For example, the AS identifier may be a hostname string that indicates the name of the AS network. This may allow the identity of the AS to be determined by other AS networks performing a traceroute operation.

In some implementations, an operator of an AS network may publish one or more special DNS names (such as "notx.asnetwork1.net") in the public DNS that identifies the address(es) of their own NOTX coordinator(s). These entries in the public DNS can function to uniquely identify the NOTX coordinator(s). For each ISP along the traced route, a NOTX Coordinator may search for one or more NOTX Coordinators for an upstream AS network using the DNS names. For example, the NOTX coordaintor may perform one or more string operations on the AS identifier returnd from the reverse DNS to form a name of NOTX coordinator. For example, if the AS network name returned by a reverse DNS call is "asnetwork1", the names of NOTX coordinators for "asnetwork1" may be formed as "notx-1.asnetwork1.net", and/or "notx-2.asnetwork1.net". After a network address for a NOTX coordinator is identified for the upstream AS network, the NOTX Coordinator may then send a list of blocking requests to the address identified by one or more of the DNS entries. In some embodiments, DNS "SRV" records may be implemented, or proprietary extensions to the DNS protocol may be utilized. In some other embodiments, public record sources other than DNS may be used.

In a case where a NOTX coordinator receives multiple equivalent block requests for the same traffic from different NOTX coordinators, the NOTX coordinator may simply ignore the duplicate requests.

Implementation of a NOTX request may include two phases. First, firewalls along the filtering route may be programmed such that they block the identified undesirable traffic. Second, some routers may be programmed to forward a portion of traffic, which may include the undesirable traffic, over a distinct "filtering" network path or route. A NOTX Coordinator may implement many of the common Internet routing information protocols and then use them to update routers with "filtering routes" that redirect unwanted traffic along a secondary inspection filtering route before it is forwarded. In some aspects, one or more routers managed by an Internet Service Provider may include robust filtering capabilities, and simple blocking rules can be implemented with no secondary inspection filtering route necessary. Second inspection filtering routes may be needed when primary routers along a network path toward a source of a denial of service attack do not include packet filtering capability.

The programming of firewalls may be implemented by a firewall protocol driver on the NOTX coordinator that is specific to the firewall in use. The specific protocol used to perform firewall programming may vary by implementation. Some examples include Telnet, SSH, SNMP, or other proprietary means. Many firewalls have protocols that can be used to update their filtering tables, and a NOTX protocol driver for the various models of firewalls in typical use can be provided in some NOTX implementations.

ISPs may implement secondary inspection filtering routes through their networks that flow through firewalls rather than blind routers. These new routes through the ISP's network would typically carry only a tiny fraction of the traffic the ISP handles, and so their cost and implementation complexity should be relatively low.

To implement the filtering routes within an AS network, a NOTX coordinator may use existing routing protocols such as BGP, EIGRP, OSPF, and RIP to update the routing tables of any of the routers administered by the local Autonomous System network so that the traffic subject to the block request is routed to filtering firewalls rather than directly through the system. This is called a "filtering route" in NOTX parlance. Filtering routes may be considered the "Secondary Inspection Lanes" of the Internet. They are alternate paths through the AS network that are managed by firewalls rather than blind routers, and just like a secondary inspection lane at a national border, they take longer and are more resource intensive inspections of packets than the primary lanes through an ISP that are staffed by blind routers. Filtering routes may be considered to be the highest possible routing priority, and in this case will override other existing routes that describe alternate means to reach the end system.

When a new filtering route is activated within an AS network, a portion of the AS network traffic, including traffic identified as undesirable by the NOTX request, may be sent through the filtering route rather than through the standard routes of the AS network.

Traffic sent over a filtering route may experience increased latency. Any introduced delay will not affect unfiltered traffic flowing within the AS network, and generally an AS network does not handle a majority of traffic for any specific end-network. Therefore, the overall performance impact of a filtering route on any specific end network should be modest. However, the performance of filtering routes may be monitored to ensure that its implementation does not become burdensome to end-users.

In some implementations, a filtering route applies only to the receivers who request them. Filtering routes may also apply to traffic flowing through an AS network and destined for the original requesting receiver, whether that traffic is undesirable or not. Since many network devices provide network routes that may be specified by a destination only, all traffic to a particular destination flowing through a network device may be cut over to the filtering route for secondary inspection.

In some implementations, firewalls on the filtering route receive the traffic destined for the NOTX request originator and apply a policy to block the undesirable traffic while allowing the innocuous traffic. This policy may be based on a source address of the filtered traffic or other means as indicated in the request.

Because the NOTX coordinator may be based on standard server hardware, it may have relatively large memory and disk storage subsystems, unlike typical routers. For this reason, it may maintain a very large-scale database of NOTX blocking requests if necessary.

The NOTX coordinator will selectively publish routing table updates to the routers it controls on an as needed basis, thereby keeping the number of routing table changes in routers to a minimum. Importantly, the database of NOTX entries may not persist through a reboot or be persistently stored in some implementations. These implementations may regenerate the NOTX entries when needed.

NOTX filtering routes are typical routes. While routers do have limited memory compared to the NOTX coordinator, all modern routers have room for many hundreds of routes. Since NOTX entries are ephemeral and will be removed after attacks cease, even older routers with low memory should have no problem accommodating the additional entries that apply to them. In the worst-case scenario, a router can simply forward the malicious traffic if it cannot accommodate a NOTX filtering route entry. It is certain that some router along the path back to the source will have enough memory to handle the NOTX blocking route, and the NOTX coordinator for an AS can be configured to prefer high-memory routers along any particular route through the AS network if necessary.

Core routers on the Internet backbone will have more NOTX filtering entries than edge routers at a customer premises. These routers are also much larger and more powerful, and are designed to accommodate tens of thousands of routes.

Edge routers need only filter a very small number of attacks, and as soon as these attacks have been pushed to upstream routers, memory resources can be freed up. Most current generation premises routers have enough available memory to handle this requirement.

One or more NOTX coordinators may also control firewalls along the filtering route. These firewalls inspect the traffic on the filtering route and separate the malicious source from non-malicious traffic. The non-malicious traffic may then be routed back onto the primary route through the AS to be forwarded on to the end-user.

Some implementations of NOTX use a "publish and subscribe" mechanism for transmitting blocking routes. This design may avoid trust and authentication issues by relying on public data, such as DNS data as described above, to certify the identity of hosts alone. With this design, forging a NOTX routing request may require a bad actor to comprise the public data. Because exploitation of a DNS system is difficult, use of the public DNS to authenticate NOTX requests as described above may provide sufficient security.

To transmit a set of blocking rules from a first NOTX coordinator to a second upstream NOTX coordinator, the first NOTX coordinator may first search for the second NOTX coordinator's address in the public DNS. Upon identifying the address, the first NOTX coordinator may transmit a simple "NOTX Trigger" notification message to the second NOTX coordinator. The NOTX Trigger notification may function as an assertion that the NOTX coordinators or autonomous system network of the NOTX coordinator has made a change to its blocking rule list, and a new rule list should be obtained. The trigger message may contain information identifying the source of the notification message. In some aspects, the trigger message may indicate information identifying a originating source of routing rule changes that are the subject of the trigger.

The NOTX coordinator receiving the NOTX Trigger notification message may perform a reverse DNS lookup to determine which AS network the trigger message was transmitted from as described above. For example, the reverse DNS lookup may be based on a transmitter, originator, or source address indicated by the trigger message. The reverse DNS lookup may provide a string value that represents an identity of an entity responsible for controlling and/or managing the node with the transmitter, originator, or source address. The receiving NOTX coordinator may then perform a DNS lookup based on the string value to determine a network address for a NOTX Coordinator for the AS network identified by the string. As described above, the NOTX coordinator may perform one or more string operations, such as appending or concatenation, on the AS network identification string to form one or more hostnames of NOTX coordinators for the identified network. In some implementations, the receiving NOTX coordinator then establishes a session with the identified NOTX coordinator and uploads a list of routing rules from the identified NOTX coordinator. In this way, the NOTX coordinator providing the list of routing rule functions to authenticate an assertion made by the trigger message.

In some implementations, the receiving NOTX coordinator then parses the routing rules to determine whether any of the rules apply to network devices that are part of its network. Applicable rules may then be implemented after being filtered for compliance with the AS network's own policies.

The above disclosed design provides for a secure communication of NOTX routing rules across one or more AS networks. Because a first NOTX coordinator publishes a blocking list via a programmatic interface, a second NOTX coordinator can retrieve the list and inspect it to confirm that any NOTX blocking policies in place for the AS network corresponding to the first NOTX coordinator are currently valid for the AS network.

Additionally, when a NOTX coordinator for an AS network receives a blocking request for a particular route, public data is used to lookup the NOTX coordinator responsible for the destination network. In some implementations, the blocking list published by that NOTX coordinator is then inspected to determine whether a routing rule corresponding to the request is indicated by the list. If the corresponding routing rule is not found in the list, the receiving NOTX coordinator may drop the block request as invalid.

In some implementations, the originating NOTX coordinator is determined based on the blocking request. For example, the blocking request may indicate a network address for the target of the denial of service attack. As described above, a reverse DNS lookup based on the network address may be performed to identify the AS network responsible for the target node. As also described above, a DNS lookup based on the results of the reverse DNS lookup may then be performed to identify the NOTX coordinator for that destination address. By using public data, such as DNS data, rather than data contained in the message itself, spoofing is more difficult unless the public data has been compromised. In some implementations the blocking request may be a NOTX trigger message.

Some implementations of the NOTX trigger message have characteristics that make it potentially exploitable: For example, it may be small and simple to generate. It may also cause more work to occur when it is received than is required to generate and transmit it, and there is no validation of the NOTX trigger message in some implementations.

These characteristics may enable NOTX specific DDOS attacks. Three types of NOTX triggering exploits have been identified: Those targeting a specific NOTX enabled AS network in order to cause unauthenticated blocking, those targeting an ISP with spurious NOTX triggers identifying different NOTX enabled AS networks in order to overwhelm the ISP's NOTX resources, and those targeting numerous ISPs with a trigger identifying a specific NOTX enabled AS network.

The first attack, which may include numerous spurious receptions of the same request, can be relatively simple to defend against. When a NOTX coordinator receives a first NOTX trigger, it may add its own blocking rule to its routing rule to prevent further messages from the transmitter of the NOTX trigger for some period of time. This is called NOTX reflexive blocking.

The second attack can include numerous spurious NOTX triggers identifying different NOTX enabled AS networks. This attack may be handled as would any other DDOS attack, by using NOTX's own anti-DDOS properties to begin blocking sources of DDOS attacks. This means essentially that each AS network would use its NOTX coordinator(s) as a self-monitoring sensor of NOTX DDOS attacks. The AS network provides a policy regarding what they consider to be an excessive number of requests based on their unique usage requirements. Once the NOTX coordinator has "sensed" that it is under attack (e.g. by thresholds being exceeded) it will begin acting as under any other sort of DDOS and sending out its own NOTX triggers to upstream ISPs to stop the attack. Ultimately, even successful NOTX triggering attacks cause no harm other than a few extra milliseconds of latency on inspection routes.

A third variety of attack is possible, where attackers send NOTX triggers to ISPs all over the Internet regarding a single NOTX receiver, with the goal of overwhelming the receiver's NOTX infrastructure or using the NOTX protocol as a bandwidth denial of service attack. A NOTX implementation in this instance may operate much like the current SMTP email service in that the receiver can easily throttle the rate at which it parcels out information to NOTX subscribers or disconnects from them.

When a NOTX coordinator receives a request for its blocking list, if it has not sent out a corresponding trigger message it may reply with a "disregard" message that takes only a few byes to serve. In some implementations, a NOTX coordinator may send a "disregard" message under any circumstances. When a remote NOTX coordinator receives a "disregard" message, it will not attempt to re-contact the sending NOTX host until a timeout has expired.

A NOTX coordinator may also transmit a "redirect" message in response to receiving a request for its routing rule list. This redirect message indicates that the requesting NOTX coordinator should contact a different NOTX coordinator to download the blocking list. Such a mechanism may facilitate the implementation of third-party NOTX service providers with massively scaled infrastructure that can prevent most attempts to overwhelm the NOTX infrastructure. How these services are deployed will vary from NOTX user to NOTX user according to their needs.

During some denial of service attacks, one or more NOTX coordinators for the destination node under attack may be unable to respond to a request for routing rules from other NOTX coordinators. For example, an inbound packet channel for the NOTX coordinator may be inundated with undesirable traffic, effectively preventing its use. In some network configurations, the network responsible for the node or nodes experiencing the denial of service attack will maintain multiple NOTX coordinators with diversified channels of communication to the Internet. With such a configuration, at least one NOTX coordinator for the nodes under attack can be reachable. For example, some NOTX coordinators may be hosted in various countries or using various cloud platform providers. Because it is more cost effective to add NOTX coordinators than it is to effectively perform a denial of service attack against them, an entity wishing to mitigate denial of service attacks can successfully provide enough NOTX coordinators to ensure at least one can communicate during almost any denial of service attack.

In some implementations, the NOTX Trigger packet is designed to be a simple request to apply NOTX filtering to a particular network. For example, in one implementation, a NOTX trigger packet may be a single UDP/IP packet that does not generate any return traffic. Use of the UDP protocol provides an "outbound only" trigger that is more likely to propagate out from a network whose inbound pipe is fully saturated that more complex packets or message exchanges that require bi-directional communication along a saturated inbound channel In some implementations, the NOTX trigger packet indicates the destination network for which the request is being generated. It does not specify which attack sources should be blocked or any other information. It merely indicates that a particular network is requesting additional filtering. Other information regarding filtering may be negotiated using the NOTX blocking list publication mechanism.

UDP packets may be dropped for a number of reasons, so in some implementations a NOTX Coordinator may keep track of which other NOTX coordinators have accessed its blocking list and may resend NOTX trigger packets to a NOTX Coordinator periodically until it connects and downloads a list, or until a maximum number of retries has been reached. Unlimited retries may not be implemented in some implementations, as they may indicate stale NOTX entries for which there is no longer a functional NOTX coordinator.

If an AS network receives a NOTX trigger packet from a second AS network, but is unable to establish connectivity with that second AS network's NOTX Coordinator (in order to download a routing rule list), in some implementations, the receiving AS network may determine whether the second AS network's Internet connection is saturated. For example, the receiving AS network may initiate a ping protocol request to one or more network addresses within the second AS network. Some implementations may have access to statistical information relating to network loading of one or more links implemented by the second AS network. By analyzing this statistical information, the receiving network may also determine whether the second AS network is saturated. If the connection is saturated, some implementations may reroute the traffic for the second AS network to a NOTX filtering route based on the saturation. Firewalls positioned on the filtering route may then throttle down traffic to the point that the AS network's NOTX Coordinator can establish a session with the second AS network's NOTX coordinator, and upload their NOTX routing rule list. Once the list has been uploaded, the AS network can apply routing rules indicated by the list. This may have the effect of blocking traffic causing the congestion.

In some implementations, a NOTX routing rule list may be provided by a web service published via HTTP as a RESTful service by a NOTX Coordinator. Such an interface provides for automated services to consume the list. In some implementations, the list indicates network addresses or other identifiers for hosts on the Internet that the NOTX Coordinator providing the list would like to block. Some implementations of a NOTX routing rule list indicate hosts to block and may not specific to services, times of day, or other information. The list may also include an expiration time-out for how long each indicated host should be blocked in some implementations. In some implementations, the timeout is limited to an upper value, to avoid perpetual blocks. This may be inappropriate if, for example, network addresses are reassigned.

In some implementations, the NOTX routing rule list may indicate whether a receiving NOTX coordinator should propagate the blocking list subscription request to other NOTX coordinators. Depending upon the type of attack detected by a NOTX Coordinator, the local NOTX coordinator may directly control which NOTX coordinators assist in blocking an attack. In other cases, the local NOTX coordinator may be unable to determine which NOTX coordinators are available along the network path from the source to the target node, and so would rely on receiving NOTX Coordinators to further propagate their blocking rules to other NOTX coordinators.

Some implementations of a NOTX coordinator may optimize the implementation of NOTX blocking rules by removing NOTX blocking rules that have been successfully transmitted upstream. NOTX blocking route subscription entries for these routes may remain in the NOTX Coordinator until the NOTX entry expires, but the actual blocking routes may be removed from routers as the AS network's policy permits if the AS is able to determine that the blocked traffic is no longer reaching it. Such an optimization may be implemented by removing NOTX entries for which no traffic has been received for a predetermined time period. In some implementations, only the router closest to the malicious source in the NOTX chain need keep a NOTX entry for a node transmitting undesirable network traffic.

In some implementations, a core router whose routing table is full of blocking entries (because a customer is under a broad based DDOS attack) may elect to decline further NOTX updates. The corresponding NOTX coordinator for that router may then publish blocking entries to downstream routers. Alternatively, the corresponding NOTX coordinator can indicate to the downstream NOTX coordinator, via, for example, a unidirectional message, that is unable to provide blocking for particular NOTX rules. The unidirectional message may be a non-acknowledged message. This concept of a unidirectional message provides for a completely elastic NOTX perimeter, which is able to push back towards the target node in the face of a sustained attack. This may distribute memory requirements for NOTX blocking routes throughout the corps of Internet routers dynamically.

Some AS networks may use DNS service record entries to publish the location of NOTX appliances for the various AS networks that implement NOTX. Reverse DNS entries may also be provided for routers that can be identified via an ICMP trace route for an AS network. This allows a NOTX Coordinator to identify the AS from the routers identified in the trace route as described above. While a trace-route operation may not reliably trace all the way back to a malicious source if the source is lying about its address (for example, with a spoofed source address), the trace-route may find most of the correct routers between the spoofed-source and the node under attack. This may be adequate to allow NOTX to reduce traffic from a bandwidth-consuming denial-of-service attack. Furthermore, spoofed source attacks are easily detected by the spoofer's ISP and are generally blocked across the Internet already.

Given a network address of an upstream router, the NOTX coordinator may first perform a reverse DNS lookup on the network address as described above to determine which AS controls that router. Given the fully qualified domain name of the AS provided by the reverse DNS (or the AS Network or other identifying information), the NOTX coordinator may then perform a DNS lookup for the NOTX coordinator of the upstream AS based on the results of the reverse DNS, as described above, and establish communication with it to transmit a NOTX block request. In some implementations, SecDNS may be used instead of traditional public DNS. Secure DNS (SecDNS) provides the mechanisms necessary to authenticate DNS entries used to find NOTX coordinators. Some implementations may include configuration parameters within a NOTX policy that indicate SecDNS must be used for NOTX verification.

Some denial of service attacks may include network traffic with a forged source address. Such an attack may be considered a forged malicious attack. An attacker may be motivated to perform such an attack to interrupt communications between the forged source node and other nodes along a network path between the forged source node and the target of the denial of service attack. In this attack scenario, the target node's security sensor receives the attack and determines the source. The target node(s) may generate a NOTX message seeking to block the forged source address (which is an innocent party). If the NOTX blocking capabilities are employed against the forged source, a communications disruption between at least the target node and the forged source node will occur.

One way to mitigate such an attack is with NOTX whitelisting. NOTX Whitelists may be maintained by NOTX coordinators that implement and forward NOTX messages. Before implementing a blocking policy based on a received NOTX message, or forwarding a NOTX trigger or routing rule to another NOTX coordinator, a NOTX coordinator may check a whitelist indicating known-safe network addresses. This list may include all business process-critical addresses. If an address indicated by the NOTX trigger or routing rule is whitelisted, no further action may be taken. For example, the NOTX coordinator may not update any routers under its control to implement a block corresponding to the routing rule, nor may the routing rule be forwarded on to upstream NOTX coordinators.

Other methods of verifying the legitimacy of a NOTX request may be employed. For example, a DNS lookup of an address indicated by a NOTX message may be performed to determine whether a signed DNS entry exists for the address. In implementations that require SecDNS, the lack of a SecDNS entry may indicate the address is not valid. In some implementations, a secure connection with the source of a NOTX message may be established, and verification performed based on an x.509 security certificate. In some implementations, a connection may be established with a SMTP email host and its connection string information may be verified.

In some implementations, a NOTX coordinator publishes their blocking list or routing rule list publically on the Internet. As such, anyone can obtain the blocking list from a NOTX coordinator and determine what blocking policies that NOTX coordinator is currently publishing to protect its networks. This list is used by NOTX coordinators amongst themselves to verify NOTX block requests and prevent forged requests from going into effect. This allows human administrators to inspect blocking lists along any route on the Internet to determine with certainty whether or not a networking issue from which they may be suffering is related to a NOTX block.

Some NOTX implementations include a capability for dealing with and stopping even the most virulent and persistent DDOS attacks, including attacks that completely saturate the downstream Internet connections to the target and render it useless. Upon a security sensor detecting undesirable network traffic arriving at a target node, a NOTX trigger packet is transmitted to upstream NOTX coordinators. In response, the upstream NOTX coordinators retrieve and inspect the published blocking list or routing rules from a NOTX coordinator maintaining the rules for the AS responsible for the target node.

In order to inspect a blocking list, bi-directional communication with a NOTX coordinator for the target node is needed in some implementations. In network configurations that do not include sufficient collocated NOTX coordinators positioned outside the target node's AS network, it may not be possible to perform the bi-direction communication necessary to retrieve the list of blocking rules. Additionally, when a target node's inbound Internet connection is saturated, it may be unable to execute ICMP TTL route detection and/or DNS queries necessary to identify an upstream NOTX coordinator.

NOTX "Burn-Through" mode reduces the reliance on a target network's outbound Internet connection. With "Burn-Through" mode, a blocking list or set of routing rules is included within encrypted data included in a NOTX trigger packet. These NOTX trigger packets are then transmitted from a NOTX coordinator positioned within an AS network under attack to other pre-configured peer NOTX coordinators positioned outside the network under attack, but administered by the same organization as the targeted AS network. Because in this implementation of NOTX, trigger packets are transmitted using only the outbound channel of the AS network under attack, and because outbound paths are less affected by DDOS attacks, these transmissions have a higher probability of being successfully received by the pre-configured NOTX coordinators during an ongoing DDOS attack. Because both the NOTX coordinator within the target AS network and the pre-configured NOTX coordinator are administered by the same organization, they can be pre-configured with address information and with pre-shared keys for cryptography. For example, a NOTX coordinator receiving a NOTX trigger message including encrypted data, such as address information or network rule information, may decrypt the data based on an indicating transmitter or sender of the trigger message. The receiving NOTX coordinator may determine one or more decryption parameters, such as decryption keys, based on the indicated transmitter or sender. The receiving NOTX coordinator may then decrypt data included in the trigger message based on the parameters.

In one implementation, the receiving NOTX coordinator, which may not be within a network under direct DDOS attack, uses its pre-shared key to decrypt the NOTX routing rules or blocking list entries contained in the NOTX burn through trigger packet. The ability to decrypt using the pre-shared secret key provides the authentication necessary to validate the request and verify the sender. For example, in some implementations, the encrypted data includes an encrypted version of information identifying a sender or transmitter of the trigger. After decrypting the data based on a sender or transmitter indicated in an unencrypted portion of the trigger message, the decrypted sender or transmitter information may be compared to the sender or transmitter information included in the unencrypted portion of the trigger message. If the two identifications are equivalent, the trigger message may be considered authentic and/or validated. Secret key decryption is very fast and will not be overwhelmed by nuisance fake NOTX trigger requests.

Because the NOTX coordinator external to the target network is positioned at a different physical location than the NOTX coordinator within the AS network under attack, it may not be able to use trace-route path discovery to determine upstream NOTX coordinators. Return path discovery for burn-through mode is obviated by pre-programming the NOTX coordinator with the list of peer NOTX coordinators that are closest to it. This may include a list of local ISPs and upstream ISPs that are typically encountered in TCP routes that the victim network engages in, which are discovered and stored during times of normal operation. The first two to three hops outward of the victim network should be pre-programmed in order to create a "perimeter fence" of NOTX coordinators that can be engaged using burn-through mode.

With burn through mode, an organization may manage or administer at least two NOTX coordinators: One NOTX coordinator is internal to the AS network, and one outside the AS network. For example, the second coordinator may be located at another facility owned by the organization, located in the cloud, or provided by an ISP or other NOTX application service provider.

In some implementations, burn-through mode blocking lists are especially ephemeral, and may time out within one hour. After time-out, any entries that are still needed may be replaced by standard NOTX blocking lists once the burn-through mechanism has freed up resources to allow standard NOTX processing to occur.

A coordinated attack against an organization may include attempts to discover all of the target organization's NOTX coordinators using the public DNS. For this reason, secondary NOTX coordinators used as Burn-through proxies may not be registered in DNS so as to obscure their identity.

FIG. 1 is an overview diagram illustrating one implementation of NOTX incorporating aspects described above. FIG. 1 shows a network 100 that includes a source node or malicious node 130 and a destination node or target node 145. The network 100 also includes three autonomous system networks 150a-c. In an embodiment, each of autonomous system (AS) networks 150a-c may be maintained by a distinct entity, such as an ISP. In some other embodiments, each of the AS networks may be maintained by the same entity, but partitioned for other technical or logistical reasons. Within each AS network 150a-c is a NOTX coordinator 155a-c respectively. In some embodiments, each AS may maintain any number of NOTX coordinators. For example, some AS networks may not have a NOTX coordinator, while other AS networks may have multiple or a single NOTX coordinator.

The network 100 provides a communication path between the malicious or source node 130 and the target node or destination node 145. The illustrated path between the attacker and target traverses the three distinct AS networks 150a-c. The path includes several network segments or hops, identified as 160a-e, and includes three routers 170a-c. The target node 145 is shown positioned behind a firewall 175a within the AS network 150c. One or more bidirectional communication links 160a-e between the target node 145 and the source node 130 may be saturated in at least one direction. For example, because of network traffic generated by source node 130, an inbound portion to target node 145 of bidirectional communication link 160d and 160e may be saturated. In response to a denial of service attack by the attacker 130 along bidirectional links 160a-e forming a network path to the target node 145, target node 145 may log an event to an event database 148. The NOTX coordinator 155d for AS network 150c is configured to check the event database for events indicating such an attack. NOTX coordinator 155d then reads the event from the event database 148 as indicated by data path 147.

In some embodiments, target node 145 may perform other actions in response to determining it is under attack, or that an undesirable network message has been received. For example, target node 145 may log an entry in a system log file. In some aspects, the syslog protocol may be used. In an embodiment, target node 145 may send a SNMP message in response to determining that undesirable network traffic has been received. In these embodiments, the NOTX coordinator 155d may be configured to read the event generated from the SNMP message, for example, by querying a network management facility (not shown) operating within AS network 150c. In another aspect, target node 145 may send an email message to an email address associated with undesirable network traffic. NOTX coordinator 155d may be configured to monitor or read email delivered to the email address. In yet another aspect, the target node 145 may be configured to provide an HTML Dashboard web interface (not shown) that indicates it has received undesirable network traffic. This HTML dashboard may be intended for human readers. In some aspects, the NOTX coordinator 155d may be configured to programmatically monitor the HTML dashboard provided by the target node 145 and determine it has received undesirable network traffic based on data provided by the dashboard. In some other aspects, target node 145 may be configured to send a notification, such as a network message, that it has received undesirable network traffic directly to NOTX coordinator 155d.

Based on the notification provided, either directly or indirectly by the target node 145, NOTX coordinator 155d may create one or more blocking rules to reduce or prevent entirely the undesirable network traffic from reaching the target node 145. For example, the blocking rule may indicate that any network message or packet meeting criteria should not be forwarded, should be blocked, and/or should be rerouted down a filtering route as described above. In one embodiment, the criteria may indicate that a network message indicating a source address corresponding to a network address of the attacker node 130 and a destination address corresponding to a network address of the target node 145 should be blocked or not forwarded, or rerouted down a filtering route. Once the rule is established, it may be added to a list of rules maintained by the NOTX coordinator 155d. The NOTX coordinator 155d may then share its rule set with other NOTX coordinators maintained by AS network 150c. For example, NOTX coordinator 155d may share its rules list with NOTX coordinator 155c.

Either NOTX coordinator 155c or 155d may then determine a network path taken by the undesirable network traffic. In some embodiments, the NOTX coordinator 155c or 155d performs a traceroute operation to determine a network path between the attacker 130 and the target node 145. In some embodiments, each NOTX Coordinator 155a-d publishes reverse DNS addresses for the IP addresses of each router 170a-c within the AS network. In an embodiment, this allows each AS network along the bidirectional communication links 160a-e forming a network path between the attacker node 130 and target node 145 to be identified via a trace-route operation as described above.

Based on the trace-route information and the reverse DNS information obtained from the public DNS server 136, NOTX coordinator 155c may then identify one or more network addresses of NOTX coordinators for AS network 150b. The NOTX Coordinators may be identified by forming one or more hostnames based on a string returned by the reverse DNS that identifies the AS network 150b. For example, as described above, if the AS network name returned by the reverse DNS call is "asnetwork1", NOTX coordinator hostnames may be formed in one implementation by appending additional identifiers to the AS network name, such as "NOTX-1.asnetwork1.net." Once the network addresses of one or more NOTX coordinators of AS network 150b have been identified, FIG. 1 shows the NOTX coordinator 155c sending a NOTX trigger message 180a to the NOTX coordinator 155b through firewall 180a. NOTX Coordinator 155b is at least partly responsible for the AS network 150b. In some implementations, NOTX coordinator 155b may coordinate NOTX for AS network 150b. Note that a bidirectional communication channel between NOTX coordinator 155c and 155b may not be saturated or flooded with traffic from the denial of service attack generated by malicious node 130, as it is not using network path 160a-e. In an embodiment, the trigger message 180a may simply indicate that a list of blocking rules maintained by NOTX coordinator 155c or 155d has changed. Upon receiving NOTX trigger message 180a, the NOTX coordinator 155b queries the NOTX coordinator 155c for a current list of NOTX blocking rules maintained by the coordinator 155c via message exchange 181a and 182a.

In some aspects, the target node 145 or the NOTX coordinator 155d may be considered an originating node or entity of the routing rule blocking or otherwise rerouting traffic from attacking node 130 to target node 145. NOTX coordinator 155c is not considered an originating node or entity, but acts as a proxy for the target node 145 and NOTX coordinator 155d because these nodes may be unable to communicate over network path 160.

Upon obtaining NOTX coordinator 155c's blocking rules, NOTX coordinator 155b may apply one or more filters to the blocking rules. For example, a white list may be applied to the blocking rules to remove rules that a network policy prohibits NOTX coordinator 155b from implementing. Other filters may also be applied to the blocking rules received from NOTX coordinator 155c. After the blocking rules received from NOTX coordinator 155c have been filtered based on one or more applicable policies, the NOTX coordinator 155b may add the filtered blocking rules from the coordinator 155c to its own list of blocking rules. NOTX coordinator 155b may then apply the new rules received from NOTX coordinator 155c. NOTX coordinator 155b may apply the blocking rules by configuring routers 170b-c. For example, NOTX coordinator 155b may be configured with administrative privileges to routers 170b-c, such that it is permitted to change the configurations of the routers as necessary to implement the blocking rules received or indicated by NOTX coordinator 155c. By applying the blocking rules received from NOTX coordinator 155c, NOTX coordinator 155b shuts down the network path for packets send from the attacker node 130 to target node 145 at routers 170b-c.

In response to receiving the blocking rules from NOTX coordinator 155c, NOTX coordinator 155b may perform its own set of traceroute operations for each of the new rules received from coordinator 155c to identify upstream AS networks for each of the rules received. For example, NOTX coordinator 155b may identify via a traceroute information and reverse DNS information that NOTX coordinator 155a is responsible for the AS network 150a, which is also along the network path between the malicious attacker node 130 and target node 145. NOTX coordinator 155b may then send a NOTX trigger message 180b to the NOTX coordinator 155a.

In a similar fashion as described above with respect to the propagation of blocking rules from NOTX coordinator 155c to NOTX coordinator 155b, NOTX coordinator 155a may obtain a list of blocking rules from NOTX coordinator 155c via message exchange 181b and 182b. NOTX coordinator 155a may filter the rules received from NOTX coordinator 155c and apply the new rules to router 170a, for which NOTX coordinator 155a has administrative privileges. By applying the blocking rules from NOTX coordinator 155c, the path between the attacker node 130 and target node 145 is shut down further upstream at router 170a.

Figure 2:
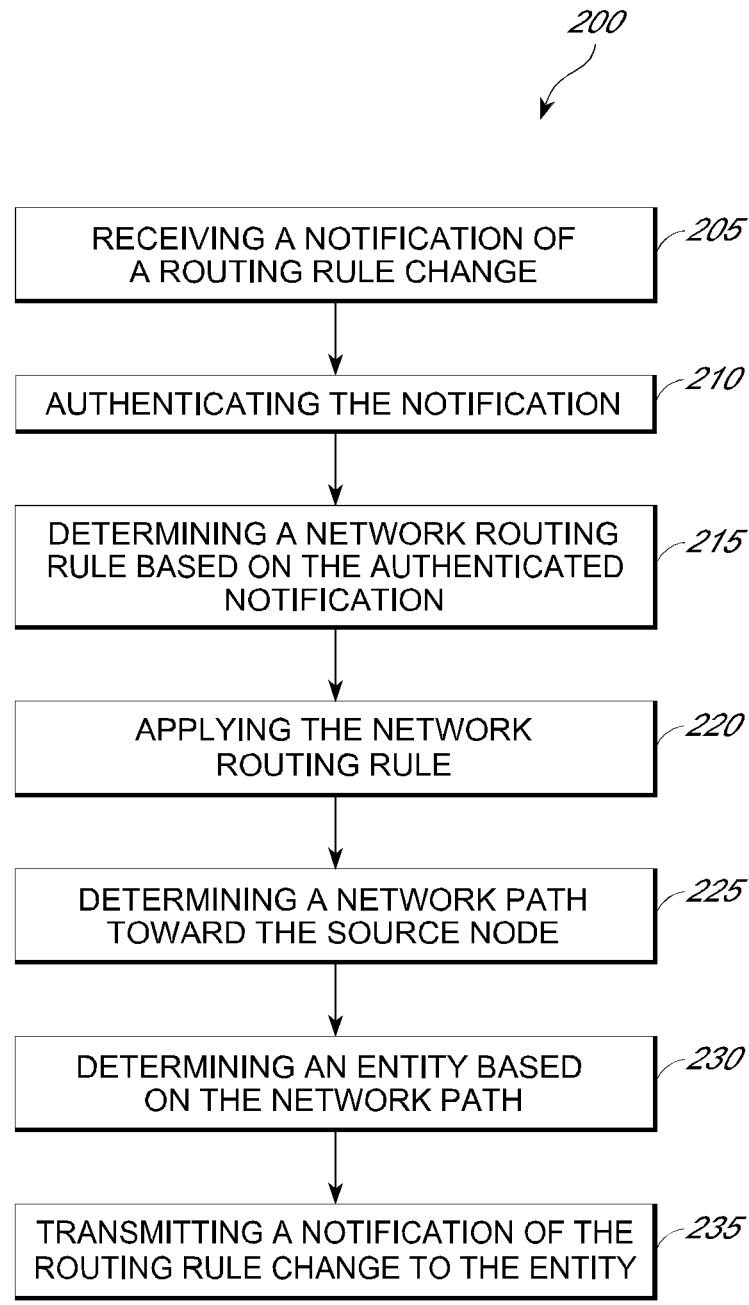
FIG. 2 is a flowchart of one implementation of a process for managing traffic on a network.

FIG. 2 is a flowchart of a method of managing network traffic. In an embodiment, a process 200 may be performed by a NOTX coordinator, such as any of the NOTX coordinators 155a-d of FIG. 1.

In block 205, a notification of traffic routing rule change is received. The notification may indicate that one or more routing rules for an originating node or AS network have been updated in response to reception of undesirable network traffic. In an embodiment, a routing rule is included, perhaps in encrypted form, in the notification. In some embodiments, a routing rule is not included in the notification itself but may be indicated indirectly by the notification.

In an embodiment, the notification has been transmitted by an originating node or originating AS network. An originating node or originating AS network is a node or network that first determined that the routing rule change should be made. For example, an originating node or originating AS network may be a target node or target AS network experiencing a denial of service attack, and determines a routing rule that will block at least a portion of the attack traffic from reaching the target or originating node or AS network. In another embodiment, the notification has been transmitted by a node or AS network that is not the originating node or AS network, but may be a node or AS network upstream of the originating node or AS network relative to the undesirable network traffic.

In an embodiment, the notification may be an entry in a log database such as log database 148 of FIG. 1. In another embodiment, the notification may be a network message. For example, the notification may be message 156 transmitted between a first NOTX coordinator 155d and a second NOTX coordinator 155c that maintain a trust relationship. In such an embodiment, the notification may include an encrypted routing rule. In an embodiment, the notification may be message 180a, transmitted between two NOTX coordinators 155c and 155b that do not maintain a trust relationship. In an embodiment, the notification may indicate a destination or target network address for a changed NOTX routing rule. Alternatively, the notification may indicate an entity responsible for a NOTX routing rule that has changed. For example, the notification may indicate an AS network. In an embodiment, the notification may indicate an originating AS network, such as AS network 150c of FIG. 1. In another embodiment, the notification may indicate a network source address of a node transmitting the notification.

In one embodiment, the notification utilizes or requires only uni-directional communication between a transmitter of the notification and a receiver of the notification. For example, in one aspect, the notification is received as a UDP datagram packet. In some implementations, an inbound network channel for an originating node or AS network may be flooded by network traffic generated by a denial of service attack. Because the node's or AS network's outbound network communication channel utilization may remain at a nominal or even a reduced level during the attack, the saturated or flooded node or AS network may successfully transmit the uni-directional notification that is received in one aspect of block 205.

In block 210, the notification is authenticated. In some embodiments, for example those using the "burn through" mode discussed above, authenticating the notification includes successfully decrypting a NOTX routing rule indicated by the notification based on a transmitter of the notification or based on an originating node or AS network indicated by the notification.

In some embodiments, authenticating the notification includes obtaining a network address of the originating node or AS network of the notification based on public data, for example, DNS data, and the notification. As described above, in some implementations, a reverse DNS lookup may be performed on an originating or source network address indicated in the notification. The reverse DNS operation may provide a string or hostname that identifies which AS network is responsible for the originating address. The AS network identifier provided by reverse DNS may then be used as a basis for one or more string operations which form one or more hostnames of NOTX coordinators for the identified AS network. As described above, for example with respect to FIG. 1, a DNS lookup may then be performed using the formed hostnames to determine the network addresses of the one or more NOTX coordinators responsible for providing a list of authenticated routing rules for the originating node indicated in the notification.

Once a network address or addresses for the one or more NOTX coordinators are determined, a message may be transmitted to one or more of the NOTX coordinators requesting a list of authenticated routing rules be provided. A message may then be received indicating or including the authenticated list of routing rules. In some aspects, a receiver of the authenticated list of routing rules may determine whether any of the rules in the list correspond to the notification as discussed below.

In block 215, a routing rule is determined based on the authenticated notification. The routing rule may indicate a source network address and a destination network address. In an embodiment, the rule indicates that packets indicating the source network address and destination network address are undesirable, and should not be routed toward the destination address.

In embodiments including a notification received in block 205 that indicate an encrypted NOTX routing rule, the network routing rule is determined by decrypting the encrypted routing rule based on data indicated by the notification. For example, the routing rule may be decrypted using decryption parameters that are determined based on a transmitter or originator of the notification of block 205.

In embodiments including a notification that does not include an encrypted network routing rule, or in cases where a receiving NOTX coordinator is unable to decrypt a routing rule indicated by the notification, determining a network routing rule may include obtaining a list of NOTX routing rules from an entity (such as an AS network or NOTX coordinator) assigned to maintain network routing rules for a network address indicated by the notification. For example, block 215 may include functions described above with respect to FIG. 1 where a list of authenticated routing rules is obtained from NOTX coordinator 155c by NOTX coordinator 155b.

The entity may be determined based on public data, such as DNS data. As discussed above, the notification may indicate an AS network or destination address. As discussed above, public DNS data may store a list of one or more NOTX coordinators responsible for maintaining NOTX routing rules for a particular AS or destination address. By querying a NOTX coordinator identified by the DNS data and responsible for maintaining NOTX rules for the destination address, a second NOTX coordinator receiving a notification can ensure it is only applying rules published by the entity responsible for the originator, or destination address or destination entity. This prevents forged NOTX notifications from causing the application of forged or invalid NOTX rules.

In block 220, the NOTX network routing rule is applied. For example, as described with respect to FIG. 1, a NOTX coordinator may configure one or more routers to apply the network routing rule. In some embodiments, application of the network routing rule may redirect a portion of network traffic to a new network path that provides for improved filtering of network traffic. In some other embodiments, application of the network routing rule may block all or a portion of traffic received over a particular network interface. In some implementations, application of one or more network routing rules may comprise transmitting a notification to a computer or server over a network, the notification indicating that the network routing rule should be applied. In some implementations, application of the network routing rule may comprise providing notification to a human operator of the rule. For example, an email, file, or print-out may indicate that the network routing rule should be applied. In some implementations, actual application of network routing rules to one or more routers may be performed by a third party. In these implementations block 220 is effectively not performed by the method 200.

In block 225, a network path leading toward the source node 130 is determined. In one embodiment, ICMP source routing is used to determine a network path between the destination or target node 145 and the source node 130. In other embodiments, traffic logs may be used to determine the network path toward the source node. In some other embodiments, routing tables maintained by an entity responsible for a NOTX coordinator performing process 200 may be inspected to determine a network path toward the source node.

In block 230, an entity is determined based on the network path. In one embodiment, an upstream entity, such as an AS network or NOTX coordinator is determined based on the network path. In an embodiment, an upstream entity may be one or more network hops closer to the source node than a node performing process 200. For example, in one aspect, one or more network addresses of one or more network devices along the network path are determined. A reverse DNS lookup is then performed on one or more of the device addresses. The reverse DNS provides a string or hostname that identifies the entity. For example, a string representation of an ISP name may be provided by the reverse DNS operation.

In some embodiments, one or more network addresses of one or more NOTX coordinators for the identified entity is then also determined as part of block 230. For example, in some aspects the string or hostname returned from the reverse DNS operation may then be appended or otherwise modified in a standardized fashion to anticipate one or more hostnames of one or more NOTX coordinator(s) for the entity. For example, the entity name/hostname may be appended with "NOTX-Coord-1."

In some aspects, multiple hostnames for potentially multiple NOTX coordinators may be formed using the standardized method to determine the hostnames for a plurality of NOTX coordinators. For example, the entity string/hostname may be appended with the strings "NOTX-Coord-1" or "NOTX-Coord-2" to form two different hostnames potentially identifying two different NOTX coordinators for the entity. Each of these hostnames may then be used in a DNS lookup to obtain a network address for one or more of the NOTX coordinators identified by the created hostnames.

In block 235, a notification of the routing rule change is transmitted to the entity. In an embodiment, the notification is a NOTX trigger message such as message 180a or 180b of FIG. 1. In an embodiment, the message indicates the network routing rule. For example, in one embodiment, the network routing rule is encrypted and included in the notification. In an embodiment, the notification indicates a source and destination node, such as source node 130 and destination/target node 140 of FIG. 1. In an embodiment, the notification indicates an entity responsible for maintaining NOTX routing rules for the destination node. For example, the notification may include a string or identifier uniquely identifying an Internet Service Provider. In some aspects, transmitting a notification of the routing rule change to the entity comprises transmitting a NOTX trigger message or other notification to one or more NOTX coordinators identified as described above with respect to block 230.

Figure 3:
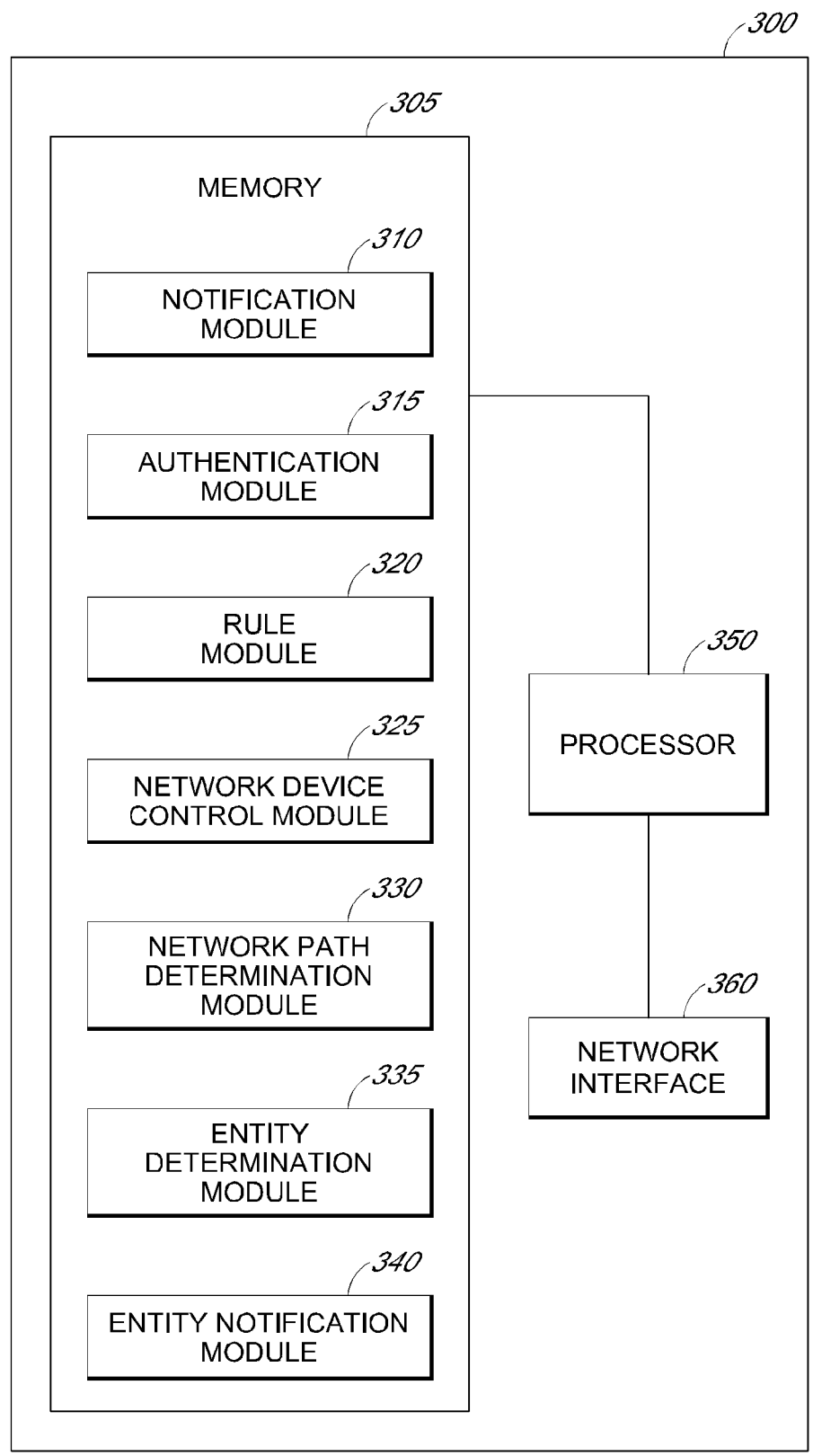
FIG. 3 s a block diagram of one implementation of an apparatus for managing undesirable network traffic transmitted from a source node to a destination node over a communications network

FIG. 3 is a block diagram of one implementation of an apparatus for managing undesirable network traffic transmitted from a source node to a destination node over a communications network. The apparatus 300 includes a memory 305, processor 350, and network interface 360. The memory 305 is operably connected to the processor 350, such that data stored in the memory may be fetched by the processor. While FIG. 3 shows one memory component, in some aspects of apparatus 300, the memory 305 may be comprised of one or more physical memories as components of one or more physical electronic devices. Similarly, while FIG. 3 shows processor 350 as one processing component, in some aspects of apparatus 300, the processor 350 may be comprised of one or more physical processing devices as components of one or more physical electronic devices.

In some implementations, the memory 305 is configured to store data organized into modules. The stored data in each module defines instructions that configure processor 350 to perform operations. In the illustrated implementation, the memory is configured to store a notification module 310, authentication module 315, rule module 320, network device control module 325, network path determination module 330, entity determination module 335, and entity notification module 340.

Instructions in the notification module 310 configure the processor 350 to receive notifications over network interface 360. The notifications may indicate undesirable network traffic has been received by another network node. The notification(s) may also indicate the source address of the undesirable network traffic. In one aspect, the notifications indicate a routing rule change. In some aspects, the notifications may include encrypted data, such as an encrypted routing rule. In some aspects, apparatus 300 will be configured to decrypt the encrypted data in the notification based on configured encryption keys. In some aspects, the data may be decrypted based on an indicated source or originator of the notification. In some aspects, instructions in the notification module 310 may configure processor 350 to perform one or more functions discussed above with respect to block 205 of FIG. 2.

Instructions in the authentication module 315 configure processor 350 to authenticate the notification received by the notification module 310. In one aspect, authenticating the notification is comprised of decrypting encrypted data in the notification. In other words, in some aspects, if apparatus 300 is able to decrypt the data in the notification, it indicates that its configured decryption keys are accurate for the encrypted data, and therefore the encrypted data was produced using encryption keys corresponding to the configured decryption keys.

In some other aspects, authenticating the notification may include identifying an entity indicated by the authentication. In some aspects, the entity can be identified based on data indicated by the notification, such as the network address. For example, public data may provide a mapping from a network address or a portion of a network address to an entity. For example, a network portion of a network address may be mapped to an entity by public data.

In some implementations, the public data is DNS data. In some implementations, apparatus 300 may perform a reverse DNS lookup on portions of a network address indicated by the notification to identify an ISP responsible for the indicated network address. Once the entity is identified, the authentication module may perform a DNS lookup to identify a NOTX coordinator for the entity. The NOTX coordinator may provide a programmatic interface that allows a list of current network routing rules for the ISP to be obtained. In some aspects, instructions in the authentication module may configure processor 350 to perform one or more functions discussed above with respect to block 210 of FIG. 2.

Instructions in the rule module 320 configure the processor 350 to determine a network routing rule based on the authenticated notification. For example, instructions in the rule module 320 may, in one aspect, configure processor 350 to obtain the list of current network routing rules from the NOTX coordinator identified by the authentication module 315. In some aspects, instructions in the rule module 320 may configure processor 350 to perform one or more functions discussed above with respect to block 215 of FIG. 2.

Instructions in the network device control module 325 configure the processor 350 to control one or more network devices. For example, the instructions in the network device control module 325 may configure processor 350 to control one or more routers, such as routers 170*a-c* illustrated in FIG. 1. The routers may be controlled to implement one or more rules identified by the rule module 320. In some aspects, instructions in the network device control module 325 may configure processor 350 to perform one or more functions discussed above with respect to block 220 of FIG. 2. In some aspects of apparatus 300, the network device control module 325 may not be present.

Instructions in the network path determination module 330 configure processor 350 to determine a network path to a source node. In one aspect, the source node is indicated by the notification received by the instructions in the notification module 310.

In some aspects, instructions in the network path determination module 330 may configure processor 350 to perform ICMP source routing to identify a path to the source node. In some aspects, the instructions in the network path determination module 330 may determine a network path based on network configuration tables. In some aspects, instructions in the network path determination module 330 may configure processor 350 to perform one or more functions discussed above with respect to block 225 of FIG. 2.

Instructions in the entity determination module 335 configure processor 350 to determine an entity based on the network path determined by the instructions in the network path determination module 330. In one aspect, instructions in the entity determination module 335 may identify a node that is closer to the source node than one or more network nodes maintained by an AS network or ISP managing apparatus 300. The entity determination module 335 may then perform a reverse DNS lookup to map from a network address of the identified closer node to an identifier of the ISP or AS responsible for the identified closer node. In some aspects, instructions in the entity determination module 335 may configure processor 350 to perform one or more functions discussed above with respect to block 230 of FIG. 2.

Instructions in the entity notification module configure processor 350 to transmit a notification to the entity identified by the entity determination module 335. The notification transmitted to the entity may include some or all of the data included in the notification received by the notification module 310. In some implementation, the transmitted notification may indicate a source node or target node that was indicated or included in the notification module received by notification module 310. In some aspects, instructions in the entity notification module 340 may configure processor 350 to perform one or more of the functions discussed with respect to block 235 of FIG. 2.

Figure 4:
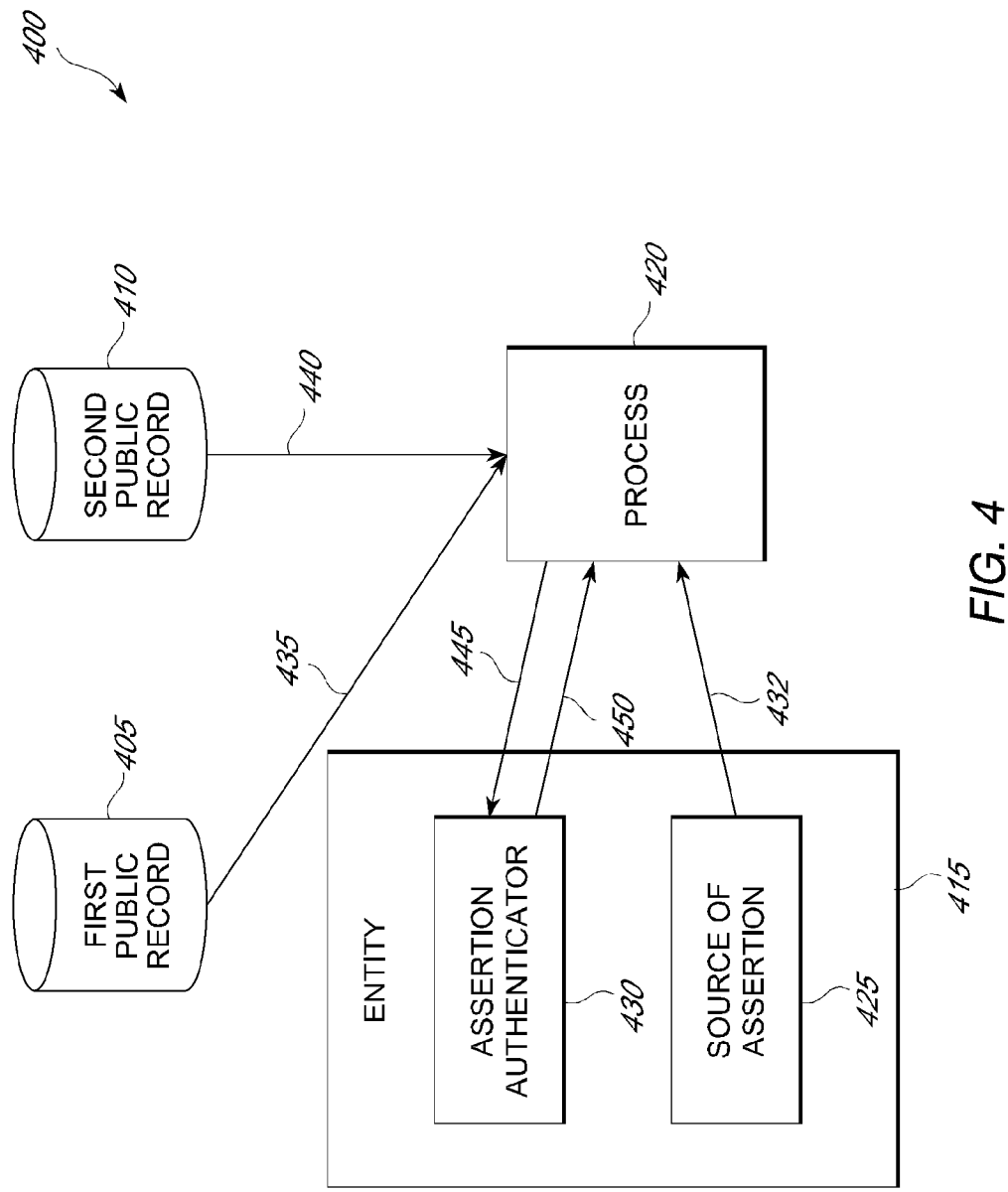
FIG. 4 is an overview diagram illustrating one implementation of a system for authenticating an assertion of a source.

FIG. 4 illustrates one implementation of a system for authenticating an assertion of a source. Shown are a first and second public record 405 and 410 an entity 415, and a process 420. The entity includes a source of an assertion 425 and an assertion authenticator 430. In some aspects, the source of the assertion 425 may be a computer network node (or target node) or AS network that is receiving undesirable network traffic from one or more attacking nodes (not shown). In some aspects, an entity 415 may be an ISP responsible for the computer network node, and may generate the assertion 432. The assertion 432 may indicate that routing rules associated with traffic transmitted between the attacking node(s) and the source 425 be changed. For example, the source 425 or the entity 415 may request that such traffic be blocked, or otherwise filtered.

The assertion authenticator (AA) 430 is responsible for maintaining a list of authenticated assertions made by the source 425, or target node in the example above, among possibly other sources or network nodes. The entity 415 may be responsible for maintaining one or more AA's, such as AA 430, all or a portion of which may also maintain a list of assertions made by the source 425.

The entity 415 may also register information about itself in a first public record database 405. In some aspects, an Internet Service Provider (ISP) may associate, via a first public record 405, ISP identifying information with one or more network addresses. In some aspects, at least a portion of the one or more network addresses may be associated with network routers (not shown). In some aspects, a portion of the one or more network addresses may be associated with sub-networks or network nodes for which the ISP is responsible.

For example, the first public record 405 may enable the process 420 to obtain information identifying the entity 415 based on a router IP address. In some aspects, a notification of an assertion 432 by the source 425 may indicate a network address. For example, the notification 432 may indicate the network address of the source 425. Based on the first public record 405, the process 405 may identify the entity 415 responsible for the source 425 based on notification 432.

To facilitate identification of the AA 430, a second trusted public record 410 may provide a mapping from one or more sources or entities 425 or 415 to one or more assertion authenticators 430. Other information regarding an AA, such as AA 430 may also be included in the second public data 410, such as network address information or contact information for the AA 430. The public data 410 may also associate the AA 430 to the entity 415. The public data 410 may then enable the process 420 to identify the assertion authenticator 430 based on an entity 415 or based on the source of the assertion 425.

In some embodiments, the AA 430 provides a network communications interface for providing assertion information. In these embodiments, the AA 430 may register a network address or hostname associated with the assertion authenticator 430 or its network interface. Identifying the AA 430 may then include determining its network address from the public data 410.

A sequence of communications that provide for the authentication of an assertion by the source 425 includes the assertion 432 transmitted from the source to a process 420. The process 420 may then obtain public data 435 from the first public record 405 that maps the source indicating in the assertion 432 to the entity 415. The process 420 may then read public data 440 from the second public record 410 that provides a mapping from the entity 415 to one or more assertion authenticators, such as assertion authenticator 430. Process 420 may then communicate with assertion authenticator 430 via message exchange 445/450 to authenticate the assertion 432 of the source 425.

Figure 5:
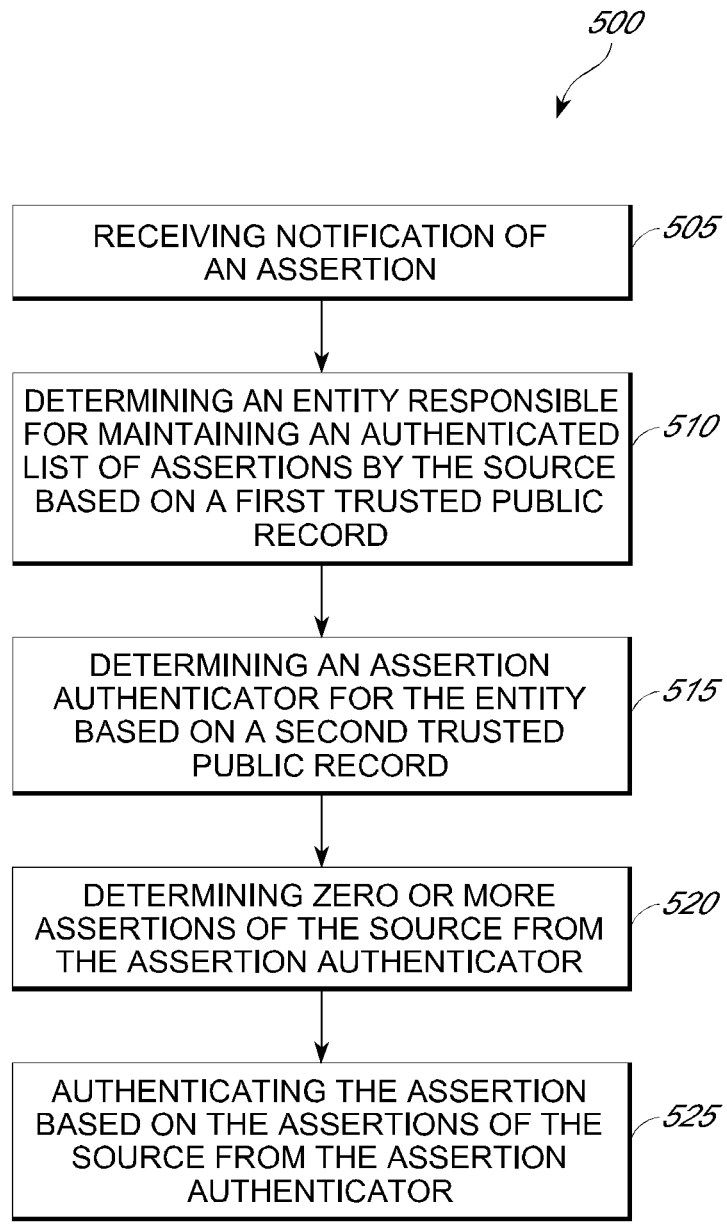
FIG. 5 is a flowchart of a process for authenticating the assertion of a source.

FIG. 5 is a flowchart of a method for authenticating an assertion by a source in an environment characterized by distributed control. In some aspects, the environment may include a lack of a recognized central trusted authority for authentication. In some aspects, process 500 may be performed by apparatus 300 of FIG. 3, apparatus 600 of FIG. 6, apparatus 750 of FIG. 7B, apparatus 850 of FIG. 8B, or apparatus 950 of FIG. 9B. Process 500 is a process of authentication that may be considered "sender oriented," in that the message being authenticated may be, in some aspects, a request by the sender for the receiver to take some action on its behalf. With these type of "sender oriented" notifications or requests, if the receiver can validate that the sender or requestor is indeed who they claim to be, and what they are asserting is truly intended, then the receiver may take an action. This type of authentication may be different than authentication in other domains, for example, in the authentication of email messages. With an email message, the sender of the email is not typically requesting the receiver of the email to perform an action on its behalf. In fact, the transmitter or intermediary sender of the email is not typically of particular interest to the transaction between an author of the email and a receiver or reader of the email. Instead, the email message content is most relevant.

In block 505, a notification of an assertion is received. For example, as shown in FIG. 4, notification 432 may be received by process 420 from a source 425. The notification may indicate a network address of the source 425. Alternatively, the notification may indicate a subnet address of the source 425. Alternatively, the notification may indicate the entity 415.

In block 510, an entity responsible for maintaining an authenticated list of assertions by the source is determined based on a first trusted public record. For example, as shown in FIG. 4, process 420 may determine the entity based on first public record 405. Process 420 may use an originator or source of the assertion network address indicated by the notification to lookup entity identifying information in first public record 405. For example, in one aspect, the entity may be an Internet Service Provider, and the public record may map the network address to a string or hostname such as "ISP1." In one aspect, process 420 may receive a string from first public record 405 of "ISP1" based on information indicated by the notification 432 such as the originator or assertion source network address. In one aspect, the first public record 405 is a reverse DNS entry mapping the network address indicated by notification 432 to a string identifying the entity (i.e. "ISP1"). In another aspect, the notification may indicate the entity directly. In this aspect, block 510 may not be performed.

In block 515, an assertion authenticator is determined for the entity based on a second trusted public record. In one aspect, process 420 may use the entity identifying information determined in block 510 to determine the assertion authenticator 430 for entity 415 from second public record 410. In one aspect, the second public record is a public DNS hostname to network address mapping. Process 420 may create a hostname based on the entity identifying information or in some aspects, a string. The hostname may then be used to perform a DNS lookup to obtain a network address of assertion authenticator 430.

In block 520, zero or more assertions of the source are determined from the assertion authenticator. In one aspect, the assertion authenticator functions as an aggregator of authenticated assertions for some domain. For example, in some implementations, authenticated assertions of a network node or AS network may be maintained by an assertion authenticator. In one aspect, as shown in FIG. 4, the process 420 may query the assertion authenticator 430 via message 445 for a list of assertions made by source 425. The assertion authenticator then sends the list to process 420 via message 450.

In block 525, the assertion is authenticated based on the assertions of the source from the assertion authenticator. In one aspect, the assertion is authenticated if the zero or more assertions determined in block 520 include a new assertion. For example, in one aspect, process 420 may maintain a list of previously authenticated assertions by source 425. If the assertions determined in block 520 include new assertions other than the previously authenticated assertions, the assertion is authenticated. In some aspects, these new assertions may represent routing rules that have not yet been applied by process 420. In some aspects, process 420 may then apply the new routing rules.

Figure 6:
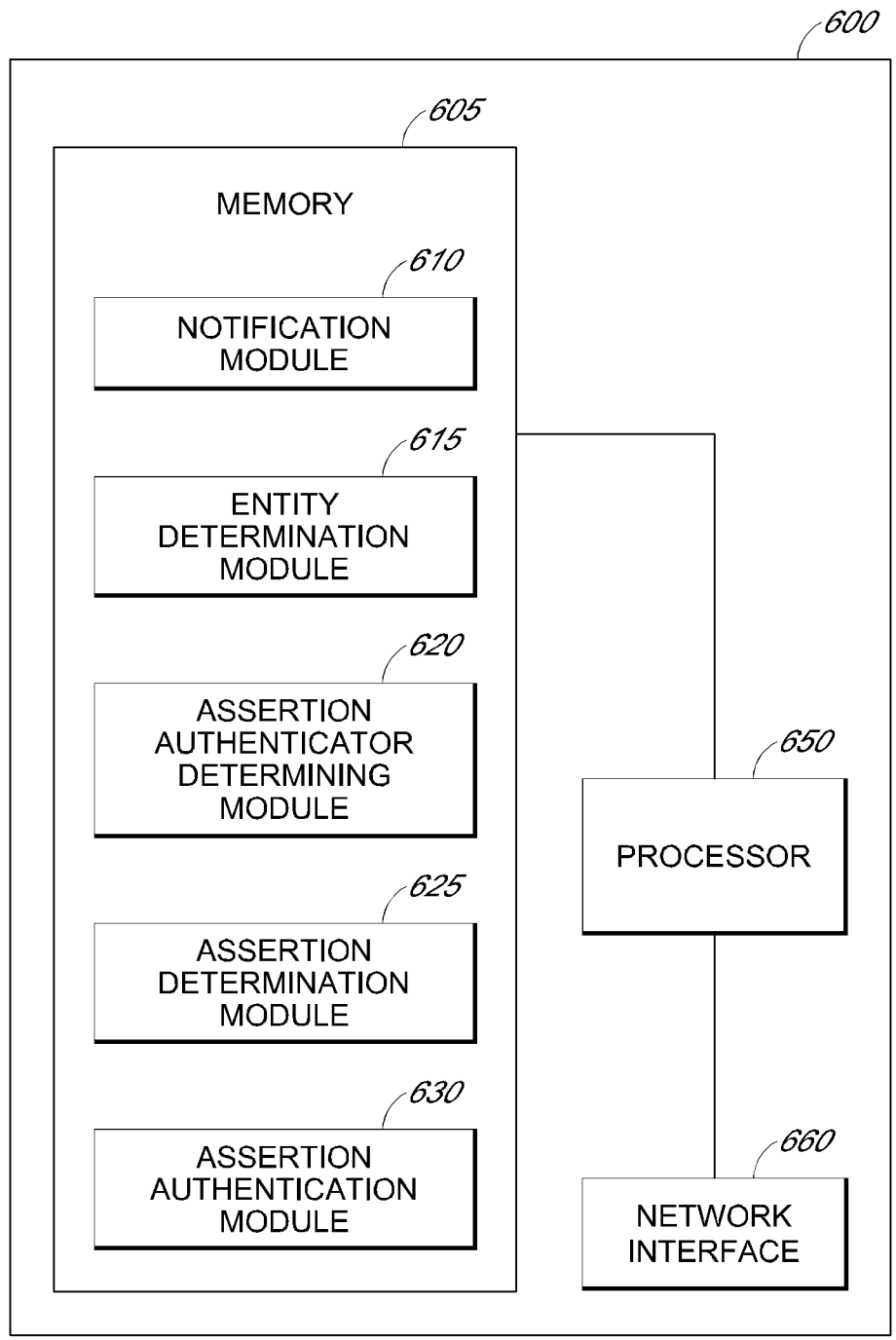
FIG. 6 is a block diagram of one implementation of an apparatus that authenticates the assertion of a source.

FIG. 6 is a block diagram of one implementation of an apparatus for authenticating an assertion of a source. The apparatus 600 includes a memory 605, processor 650, and network interface 660. The memory 605 is operably connected to the processor 650, such that data stored in the memory may be fetched by the processor 650. In some implementations, the memory is configured to store data organized into modules. The stored data in each module defines instructions that configure processor 650 to perform operations. While FIG. 6 shows one memory component 605, in some aspects of apparatus 600, the memory 605 may be comprised of one or more physical memories as components of one or more physical electronic devices. Similarly, while FIG. 6 shows processor 650 as one processing component, in some aspects of apparatus 600, the processor 650 may be comprised of one or more physical processing devices as components of one or more physical electronic devices.

In the illustrated implementation, the memory 605 is configured to store a notification module 610, an entity determining module 615, an assertion authenticator determining module 620, an assertion determining module 625, and an assertion authentication module 630.

The notification module 610 includes instructions that configure processor 650 to receive notification of an assertion. In some aspects, the notification module 610 may be configured to perform one or more functions discussed above with respect to block 505 of FIG. 5. The entity determining module 615 includes instructions that configure processor 650 to determine an entity based on the notification received by instructions in the notification module 610. In some aspects, the entity determining module 615 is configured to perform one or more of the functions discussed above with respect to block 510 of FIG. 5.

The assertion authenticator determining module 620 includes instructions that configure processor 650 to determine an assertion authenticator based on the entity determined by the entity determining module. In some aspects, the assertion authenticator is determined based on public DNS data. In some aspects, the assertion authenticator determining module 620 may be configured to perform one or more of the functions discussed above with respect to block 516 of FIG. 5.

The assertion determining module 625 includes instructions that configure processor 650 to determine zero or more assertions from the assertion authenticator determined by module 620. In some aspects, instructions in the assertion determining module 625 may configure processor 650 to perform one or more of the functions discussed above with respect to block 520 of FIG. 5.

Instructions in the assertion authentication module 630 configure the processor 650 to authenticate the assertion determined by module 625. In some aspects, instructions in the assertion authentication module 630 may configure processor 650 to perform one or more functions discussed above with respect to block 525 of FIG. 5. Some implementations of apparatus 600 may include one or more components of apparatus 300 of FIG. 3, apparatus 750 of FIG. 7B, apparatus 850 of FIG. 8B, or apparatus 950 of FIG. 9B.

Figure 7A:
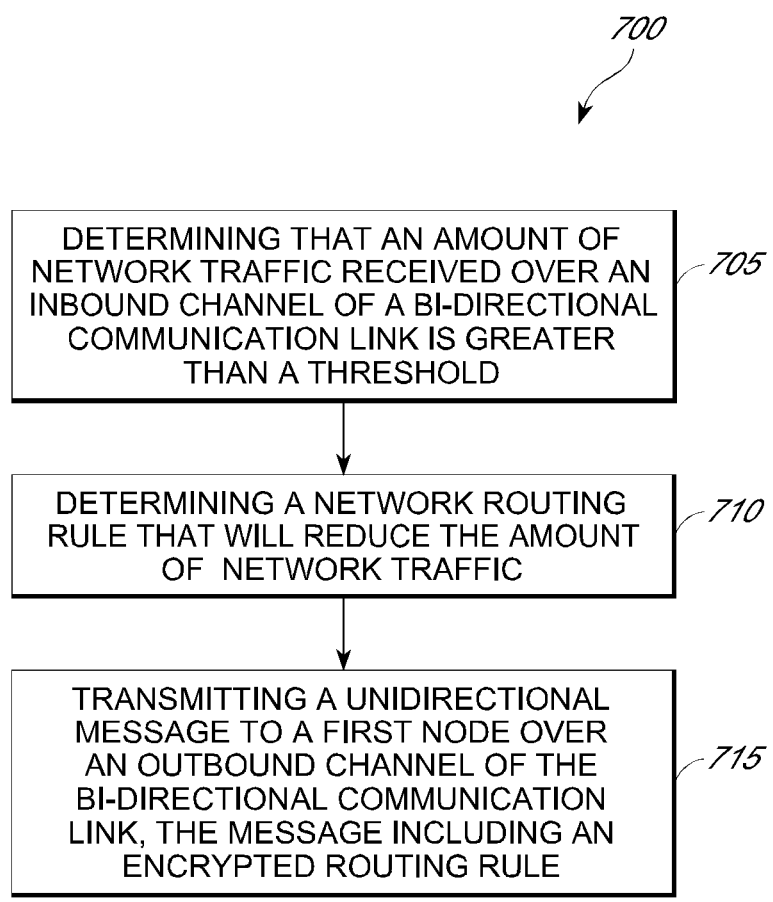
FIG. 7A is a flowchart of a method for communicating a routing rule change when under a denial of service attack.

FIG. 7A is a flowchart of a method for communicating a routing rule change when under a denial of service attack. In some aspects, a target node may be subjected to a denial of service attack, which effectively prevents bi-directional communication with the target node and other nodes sharing at least some of the communication links between the target node and a source of the attack. In some aspects, process 700 may be performed by a node or apparatus other than the target node, but a node or apparatus with inbound communication links compromised due to the denial of service attack. Therefore, the apparatus may be able to perform only outbound communication. In an embodiment, the process 700 may be performed by a NOTX coordinator, for example, NOTX coordinator 155*d* illustrated in FIG. 1.

Block 705 determines that an amount of network traffic received over an inbound channel of a bidirectional communication link is greater than a threshold. In some aspects, the amount of network traffic received from one or more particular sources over the inbound channel may be determined to be greater than a threshold. In some aspects, the amount of traffic may relate to a total size or number of bytes received over the inbound channel during a time period. In still other embodiments, a particular type of traffic received over the inbound channel may be greater than a threshold. For example, if a syn flood attack is under way, the total amount of data may be within a nominal range. However, the syn flood may present a total number of syn packets that is above a threshold predetermined for a nominal level of syn packets within a time period. In some aspects, because the amount of inbound network traffic is greater than the threshold, it may be undesirable, because it may reduce the ability of the bidirectional communication link to be used for network communications.

In block 710, a network routing rule that will reduce the amount of undesirable network traffic is determined. In some aspects, to determine the network rule, at least a portion of the inbound network traffic is analyzed to identify one or more source addresses responsible for generating a "significant" portion of the inbound traffic. In some aspects, the "significant" portion may be a portion above a second threshold. In some aspects, the significant portion is represented by a percentage of total inbound traffic.

In some aspects the network routing rule indicates that network traffic including one or more particular source network addresses (that are generating the undesirable network traffic) should not be forwarded. In some aspects, the rule may further specify one or more particular destination addresses. In these aspects, the rule may indicate that packets or messages having any of the one or more source addresses and any of the one or more destination addresses should not be forwarded to the one or more destination addresses.

In block 715, a unidirectional message is transmitted to a first node over an outbound channel of the bi-directional communication link. The message includes an encrypted version of the routing rule determined in block 710. A unidirectional message is any message that does not require bidirectional communication to successfully reach and be processed by its intended recipient. In one aspect, the message is transmitted using a UDP datagram. In one aspect, the unidirectional message is multicast. In some aspects, the unidirectional message is unacknowledged, in that no acknowledgement is sent in response or expected by a transmitter of the unidirectional message. In some aspects, attempts to acknowledge the unidirectional message may be performed by a receiver, but successful transmission and/or reception of the acknowledgement is not necessary for a receiver of the message to successfully receive and process data included in the message.

In one aspect, the routing rule may be encrypted based on private or public key encryption. In one aspect, process 700 is performed by a second node, and the first node and the second node are jointly owned or part of the same autonomous system network.

In some aspects, because the inbound channel of the bidirectional communication link is greater than a threshold, communications utilizing bidirectional communication may fail. When the inbound channel is under a denial of service attack, it may be difficult or impossible to communicate any information, for example, a routing rule change, to any entity using traditional bi-directional communication. For example, establishment of a TCP connection over the bidirectional communication link may not be possible, because a three way handshake used to open a TCP connection requires bi-directional communication. Communication of a routing rule change using unidirectional communication may be possible, as an outbound channel is sometimes usable even if an inbound channel is saturated due to a denial of service attack.

Without bidirectional communication however, it may be challenging to authenticate any notification of a rule change from a node or network under attack. Process 700 provides for an encrypted rule in the message transmitted over the outbound channel. As discussed previously, some nodes included in a trusted group may be provided or configured with corresponding encryption and decryption information. In some aspects, the encrypted rule has been encrypted using encryption keys or other facilities that are only shared within this trusted group. Therefore, successful decryption of the encrypted rule validates or authenticates the unidirectional communication, because only nodes in the trusted group have access to either the proper encryption or decryption facilities (such as encryption or decryption keys).

In some aspects, process 700 may include transmitting the unidirectional message to a second and/or third node over the outbound channel. For example, an autonomous system network may configure multiple NOTX coordinators, and configure each of them with shared encryption keys so they may communicate encrypted data between each other. The multiple NOTX coordinators may be positioned at various locations around the Internet, such that a denial of service location against one or two of the locations will not affect other NOTX coordinator locations. A NOTX coordinator performing process 700 and under a denial of service attack may effectively communicate an updated routing rule blocking traffic causing the denial of service attack by sending the unidirectional message to its peer NOTX coordinators at other locations. Since at least one of the peer NOTX coordinators may not be under a denial of service attack, it may be able to communicate bi-directionally with other AS networks to effectively forward the updated routing rule along a network path towards the source(s) of the attack.

Figure 7B:
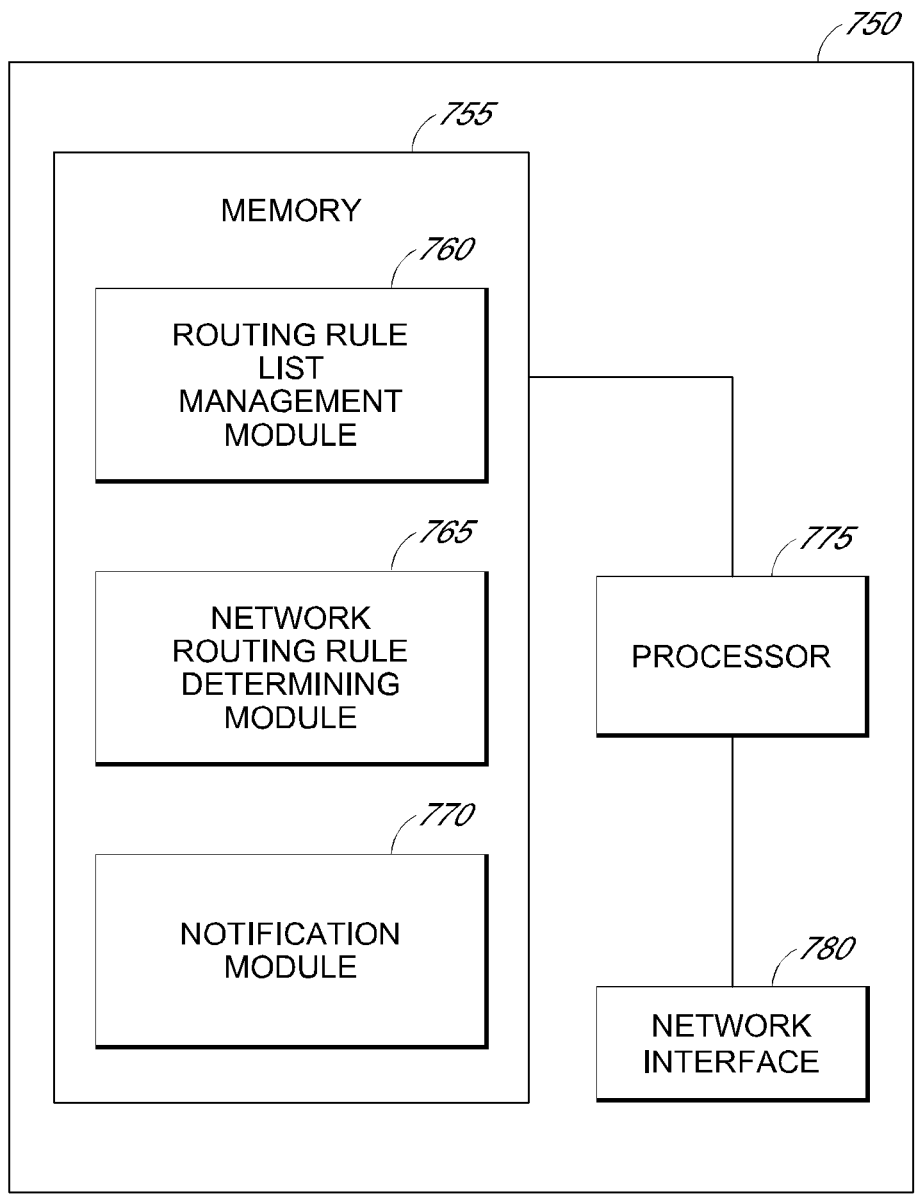
FIG. 7B is a block diagram of one implementation of an apparatus for communicating a routing rule change when under a denial of service attack.

FIG. 7B is a block diagram of one implementation of an apparatus for communicating a routing rule change when under a denial of service attack. The apparatus 750 includes a memory 755, processor 775, and network interface 780. The memory 755 is operably connected to the processor 775, such that data stored in the memory may be fetched by the processor. While FIG. 7B shows one memory component 755, in some aspects of apparatus 750, the memory 755 may be comprised of one or more physical memories as components of one or more physical electronic devices. Similarly, while FIG. 7B shows processor 775 as one processing component, in some aspects of apparatus 750, the processor 775 may be comprised of one or more physical processing devices as components of one or more physical electronic devices.

In some implementations, the memory is configured to store data organized into modules. The stored data in each module defines instructions that configure processor 775 to perform operations. In the illustrated implementation, the memory is configured to store a network traffic monitoring module 760, a network routing rule determining module 765, and a notification module 770.

The network traffic monitoring module 760 includes instructions that configure processor 775 to monitor network traffic. In some aspects, the network traffic monitoring module may be configured to perform one or more functions discussed above with respect to block 705 of FIG. 7A. The network routing rule determining module 765 includes instructions that configure processor 775 to determine a network routing rule that will reduce the amount of traffic received over the inbound channel. In some aspects, the network routing rule determining module 765 is configured to perform one or more of the functions discussed above with respect to block 710 of FIG. 7A.

Instructions in the notification module 770 configure the processor 775 to transmit a unidirectional message to a first node over an outbound channel of a bidirectional communication link. The message may include an encrypted routing rule. In some aspects, instructions in the notification module 770 may configure the processor to perform one or more of the functions discussed above with respect to block 715 of FIG. 7A. Some implementations of apparatus 750 may include one or more components of apparatus 300 of FIG. 3, 600 of FIG. 6, apparatus 850 of FIG. 8B, or apparatus 950 of FIG. 9B.

Figure 8A:
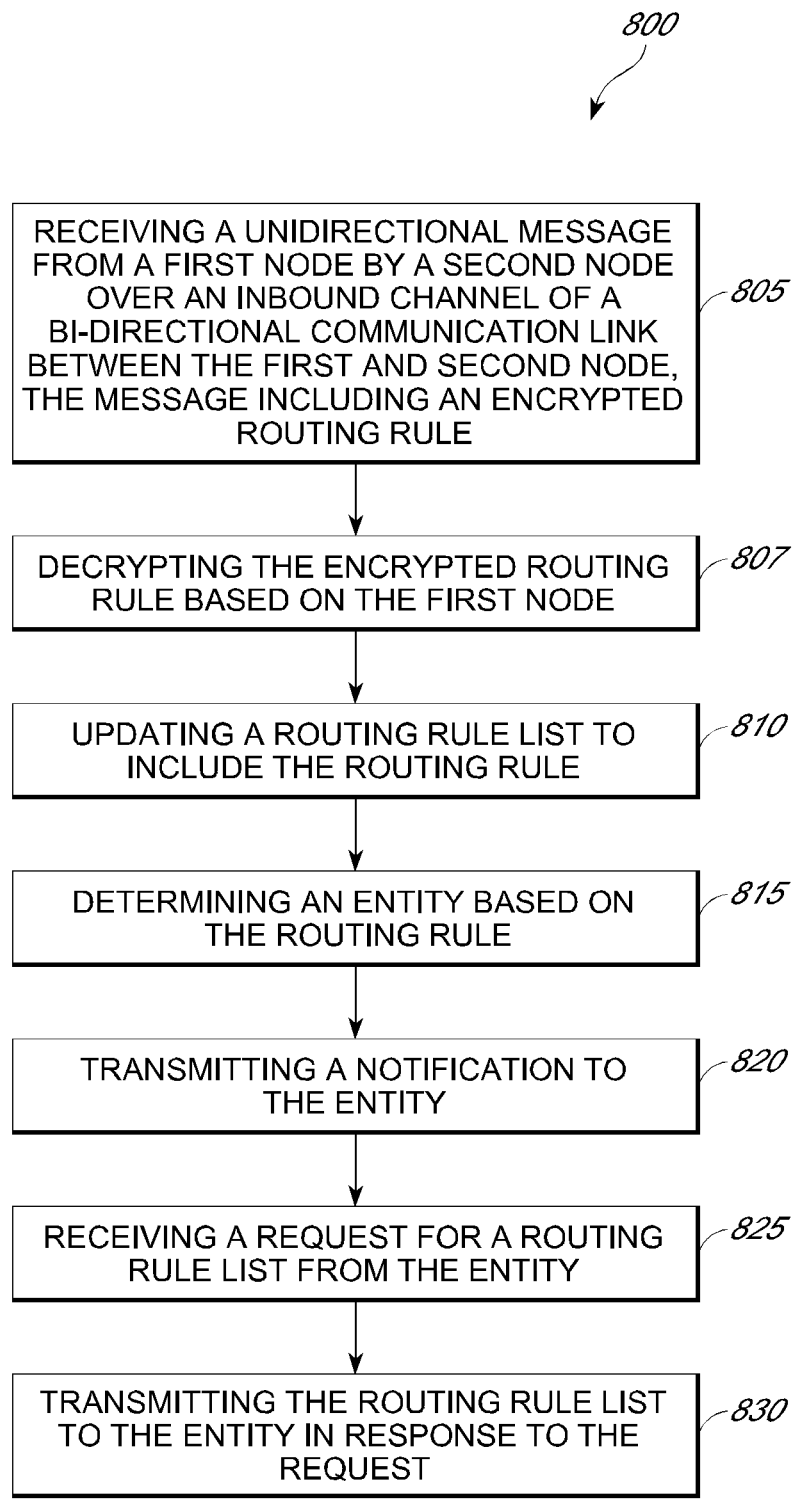
FIG. 8A is a flowchart of a method of communicating a routing rule change when an originating or target node or network is under a denial of service attack.

FIG. 8A is a flowchart of a method of communicating a routing rule change when an originating or target node or network is under a denial of service attack. In an embodiment, the process 800 may be performed by a NOTX coordinator, for example, NOTX coordinator 155*c* illustrated in FIG. 1. In some aspects, a target node may be subjected to a denial of service attack, which effectively prevents bi-directional communication with the target node and other nodes sharing at least some of the communication links between the target node and a source of the attack. In some aspects, process 800 may be performed by an apparatus or network node that communicates with a target node or network that is currently compromised by a denial of service attack. In some of these aspects, a network apparatus performing process 800 may only be able to receive data from the target node or network, but may not be able to transmit data successfully to the target node or network due to the denial of service attack.

In block 805, a unidirectional message is received from a first node over an inbound channel of a bi-directional communication link between the first node and a node or apparatus running process 800. Note that the bidirectional communication link referenced in block 805 need not directly connect to the node, apparatus, or system performing process 800, but need only be utilized along a network path between the first node and the node, apparatus, or system performing process 800. In some situations or aspects, a utilization of the outbound channel of the bidirectional communication link is above a nominal utilization. In some of these aspects, the utilization of the outbound channel may be so high that communication over the outbound channel to the first node is not possible, thus preventing bi-directional communication between an apparatus performing process 800 and the first node. In some aspects, the routing rule may be decrypted from the message based on configured encryption/decryption information previously shared with the first node.

In block 807, the routing rule is decrypted based on the first node. For example, a node performing process 800 may maintain configuration information that maps from one or more node identifiers to decryption parameters corresponding to each node. When decrypting data received from a particular node, the configuration information is searched for an identifier of the particular mode. A record in the configuration information may provide a mapping from the node identifier to decryption parameters to be used when decrypting data received from the node. In some aspects, a NOTX coordinator may maintain the list of routing rules. The ability to perform successful decryption using a pre-shared key based on an indicated originator or transmitter of the notification functions to authenticate the uni-directional message, because an untrusted source would not have access to encryption keys that correspond to the decryption keys used to decrypt the message.

In block 810, a routing rule list is updated to include the routing rule included in the unidirectional message of block 805. In block 815, an entity is determined based on the routing rule. In some aspects, a network path is determined to a source network address indicated by the routing rule. The entity may be determined based on the network path. For example, the entity may be an ISP that is identified as responsible for one or more network devices identified by the network path. The ISP may be identified based on public data that associates one or more of the network devices to the ISP. The public data may be DNS data. In block 820, a notification is transmitted to the entity. In an embodiment, the notification may identify a node, apparatus, AS network, or system performing process 800. In an embodiment, the notification may identify an entity responsible for a node, apparatus, or system performing process 800, or the first node. In some aspects, the notification is transmitted to a NOTX coordinator identified by public DNS data based on the entity.

In block 825, a request from the entity is received for a routing rule list. In some aspects, the request is a web service request. In some aspects, the request is received from a NOTX coordinator maintained by an ISP upstream of an apparatus performing process 800 relative to a network path between the apparatus and a source(s) of a denial of service attack. In block 830, the routing rule list is transmitted to the entity in response to the request. In some implementations, a reply is sent to the request of block 825, the reply including or indirectly indicating the routing rule list. For example, in some implementations, the request of block 825 may be an http request. In these implementations, transmitting the routing rule list to the entity may comprise generating and transmitting an http response including the routing rule list. In some aspects the routing rule list is transmitted to the NOTX coordinator.

Figure 8B:
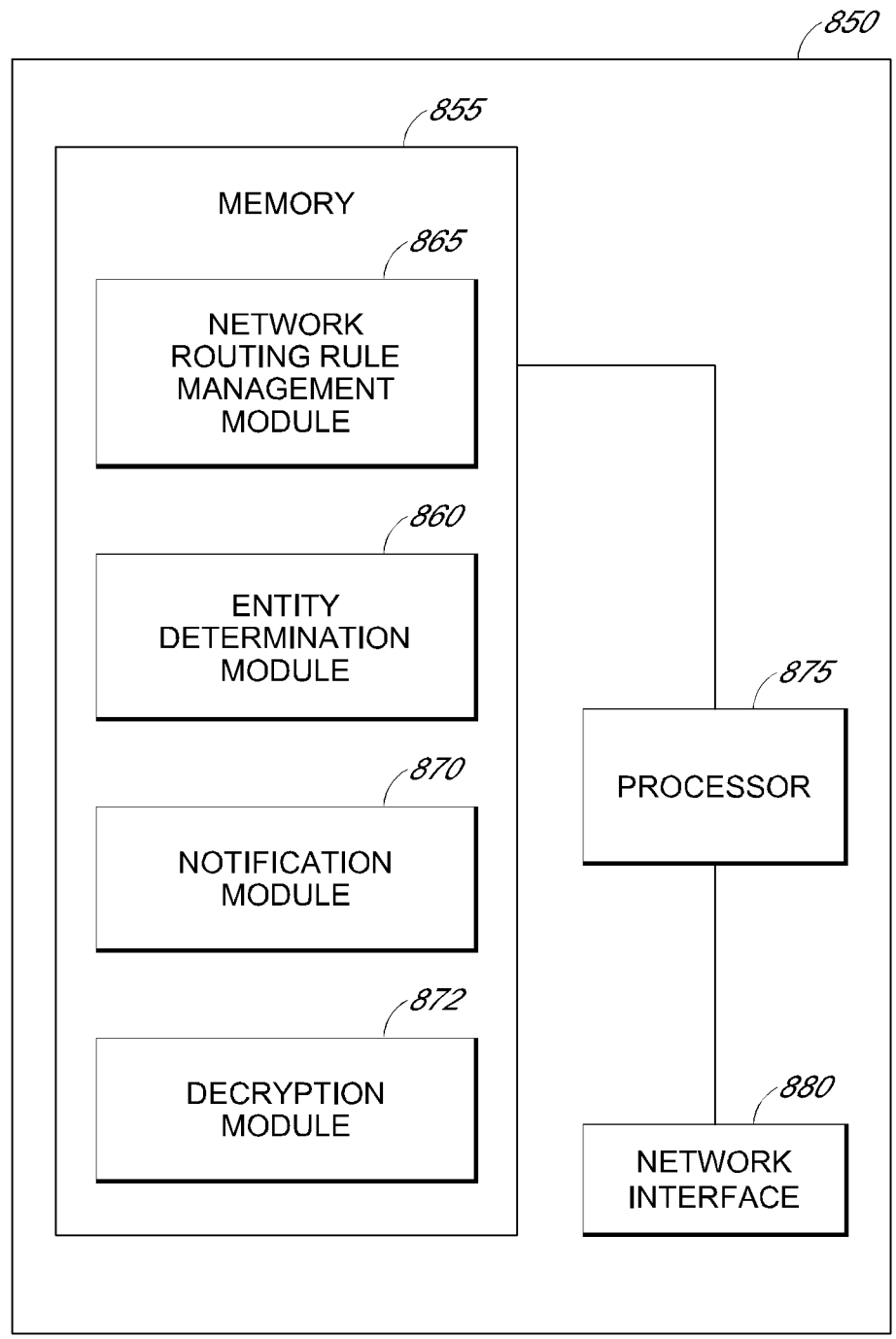
FIG. 8B is a block diagram of one implementation of apparatus for communicating a routing rule change when under a denial of service attack.

FIG. 8B is a block diagram of one implementation of an apparatus for communicating a routing rule change when under a denial of service attack. The apparatus 850 includes a memory 855, processor 875, and network interface 880. The memory 855 is operably connected to the processor 875, such that data stored in the memory may be fetched by the processor. While FIG. 8B shows one memory component 855, in some aspects of apparatus 850, the memory 855 may be comprised of one or more physical memories as components of one or more physical electronic devices. Similarly, while FIG. 8B shows processor 875 as one processing component, in some aspects of apparatus 850, the processor 875 may be comprised of one or more physical processing devices as components of one or more physical electronic devices.

In some implementations, the memory is configured to store data organized into modules. The stored data in each module defines instructions that configure processor 875 to perform operations. In the illustrated implementation, the memory is configured to store a network routing rule management module 860, an entity determination module 865, a notification module 870, and a decryption module 872.

The notification module 870 includes instructions that configure processor 875 to receive or transmit notifications. For example, in some aspects, instructions in the notification module 870 may configure processor 875 to perform one or more of the functions discussed above with respect to blocks 805 and/or 820 of FIG. 8A.

The decryption module 872 includes instructions that configure processor 875 to decrypt an encrypted routing rule received in a notification. For example, in some aspects, instructions in the decryption module 872 configure processor 875 to perform one or more of the functions discussed above with respect to block 807 of FIG. 8A.

The network routing rule management module 865 includes instructions that configure the processor 875 to manage routing rules. For example, in some aspects, the instructions of the network routing rule management module 865 may configure processor 875 to perform one or more functions discussed above with respect to blocks 810, 825, and/or 830 of FIG. 8A.

The entity determination module 860 includes instructions that configure the processor 875 to determine an entity. For example, in some aspects, instructions in the entity determination module 860 may configure processor 875 to perform one or more functions discussed above with respect to block 815 of FIG. 8A. Some implementations of apparatus 850 may include one or more components of apparatus 300 of FIG. 3, 600 of FIG. 6, apparatus 750 of FIG. 7B, or apparatus 950 of FIG. 9B.

Figure 9A:
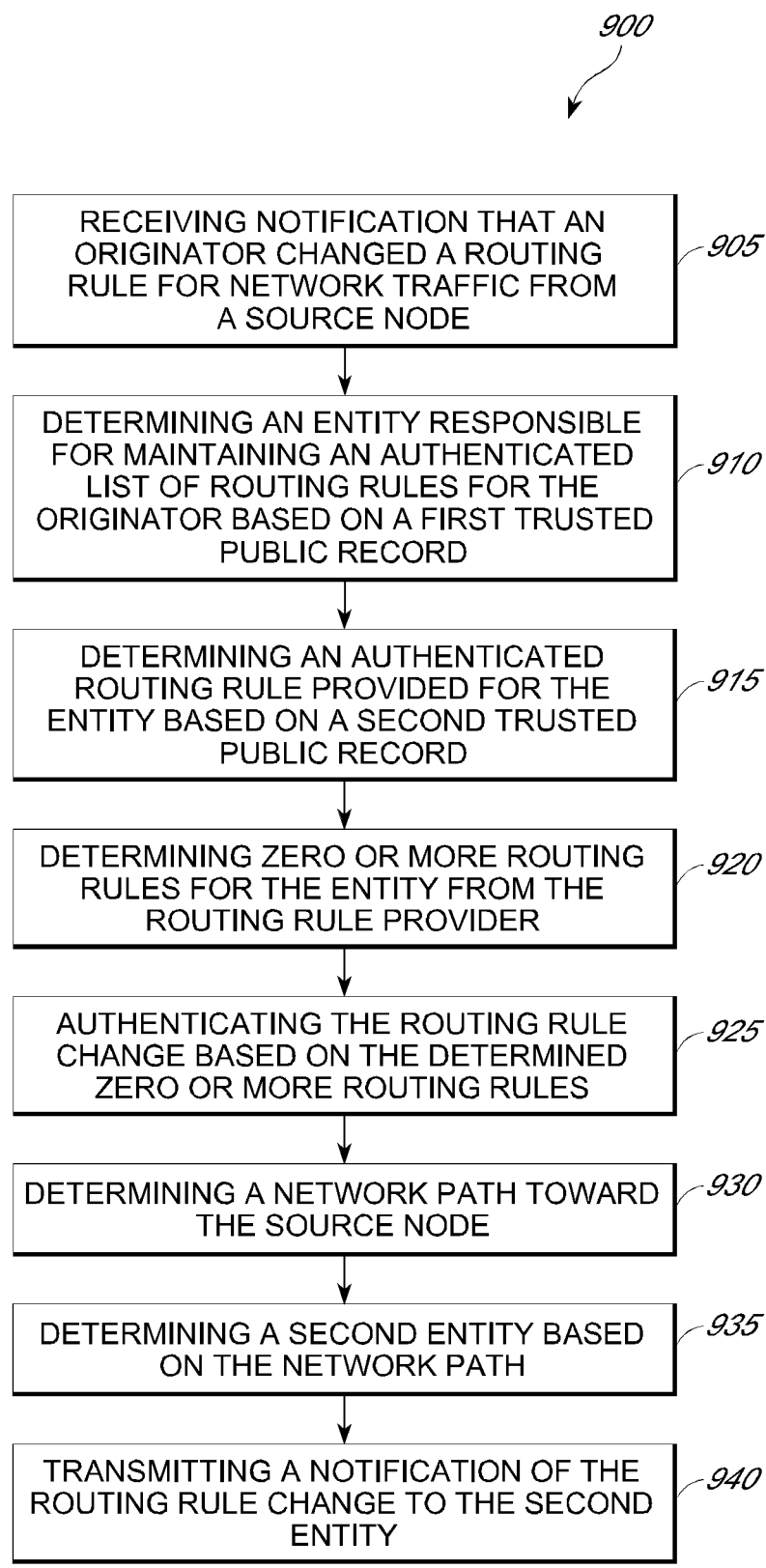
FIG. 9A is a flowchart of a method of communicating a routing rule change along a network path.

FIG. 9A is a flowchart of a method of communicating a routing rule change along a network path. Process 900 may be performed by any of apparatus 300 of FIG. 3, apparatus 600 of FIG. 6, apparatus 750 of FIG. 7B, or apparatus 850 of FIG. 8B. In block 905, a notification is received that an originator changed a routing rule for network traffic from a source node. In some aspects, an originating node, such as a node or AS network under a direct denial of service attack has transmitted the notification. In other aspects, the originator did not transmit the notification. In some aspects, block 905 may include one or more of the functions discussed above with respect to block 205 of FIG. 2 and/or block 505 of FIG. 5.

In block 910, an entity responsible for maintaining an authenticated list of routing rules for the originator is determined based on a first trusted public record. In some aspects, the first trusted public record is a record stored within a public domain name service (DNS). In some aspects, the entity is determined by performing a reverse DNS lookup on a network address derived from the notification of block 905. In some aspects, the entity may be an originator Internet Service Provider (ISP) responsible for an originating or target node on the ISP network. In some other aspects, the entity may an ISP that is upstream of the originating ISP or target node, that is responsible for one or more network devices along a network path between a source of a denial of service attack and the target node. In some aspects, the entity determined in block 910, or a node operating on behalf of the entity, transmitted the notification received in block 905. In some aspects, block 910 may include one or more of the functions discussed above with respect to block 210 of FIG. 2 or block 510 of FIG. 5.

In block 915, an authenticated routing rule list provider for the entity is determined based on a second trusted public record. In some embodiments, the second trusted public record is a record stored or retrieved from a public domain name service. In some aspects, the routing rule list provider is a NOTX coordinator as described with reference to FIG. 1. In some aspects, block 915 may include one or more of the functions discussed above with respect to block 510 and/or block 515 of FIG. 5. In block 920, zero or more routing rules for the entity are determined from the authenticated routing rule list provider. In some aspects, block 920 may include one or more of the functions discussed above with respect to block 215 of FIG. 2 and/or block 520 of FIG. 5.

In block 925, the routing rule change is authenticated based on the zero or more routing rules. For example, in some aspects, the routing rules determined from the routing rule list provider may be compared to a known list of routing rules. If one or more rules are included on the routing rule list provided by the routing rule list provider that are not on the known list, these rules may be considered new. The detection of new rules may authenticate the routing rule change. In some aspects block 925 may include one or more of the functions described above with respect to block 525 of FIG. 5

In some aspects, process 900 also includes application of the routing rule. For example, application of the routing rule may include transmitting a command or notification to a network device controller, indicating the routing rule should be applied by one or more network devices. In some aspects, application of the routing rule may include updating a router configuration based on the routing rule. In some aspects, one or more network devices may be configured to block or not forward traffic from the source node. In other aspects, traffic from the source node may be routed down an alternative network path to apply the routing rule. In some other aspects, only traffic sent by the source node to one or more destination nodes may be blocked or redirected down an alternate network path. In some aspects, process 900 includes one or more functions discussed above with respect to block 220 of FIG. 2.

In block 930, a network path toward the source node is determined. In some aspects, the path may be determined based on a trace route operation that may use ICMP source routing. In some aspects, configuration tables may be used to determine the network path. In some aspects, block 930 may include one or more of the functions discussed above with respect to block 225 of FIG. 2.

In block 935, a second entity is determined based on the network path. In some aspects, determining a second entity includes identifying one or more network devices along the network devices. A reverse DNS operation may then be performed on one or more of the network addresses associated with the network devices. The reverse DNS may return an identifier, such as a string or a hostname that identifies the second entity. In some aspects, the second entity is an Internet service provider that maintains or owns one or more of the identified network devices along the network path. In some aspects, block 935 may include one or more of the functions described above with respect to block 230 of FIG. 2.

In block 940, a notification of the routing rule change is transmitted to the second entity. In some aspects, block 235 may include one or more of the functions described above with respect to block 235 of FIG. 2.

Figure 9B:
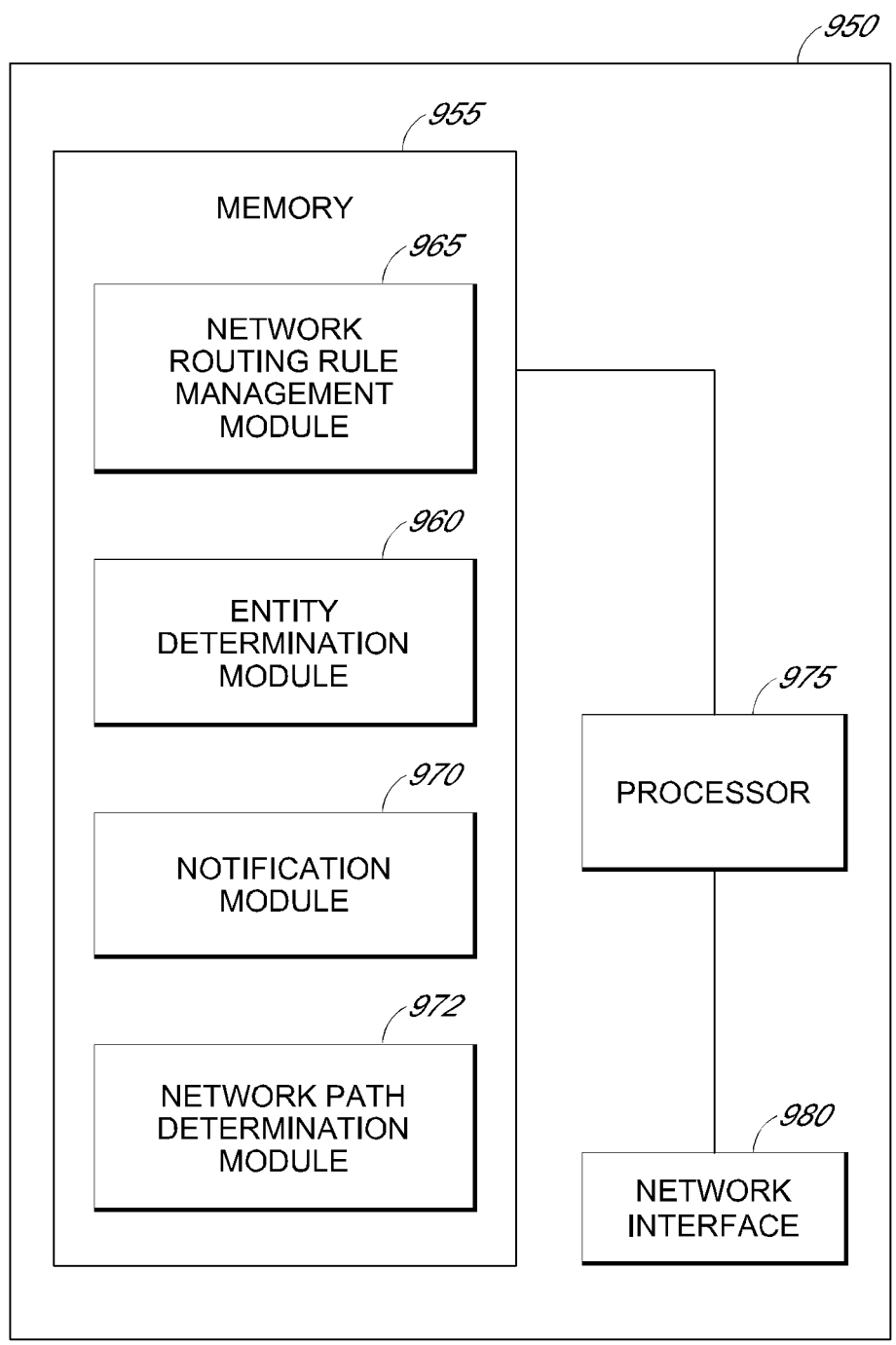
FIG. 9B is a block diagram of one implementation of an apparatus for communicating a routing rule change along a network path.

FIG. 9B is a block diagram of one implementation of an apparatus for communicating a routing rule change along a network path. The apparatus 950 includes a memory 955, processor 975, and network interface 980. The memory 955 is operably connected to the processor 975, such that data stored in the memory may be fetched by the processor. While FIG. 9B shows one memory component 955, in some aspects of apparatus 950, the memory 955 may be comprised of one or more physical memories as components of one or more physical electronic devices. Similarly, while FIG. 9B shows processor 975 as one processing component, in some aspects of apparatus 950, the processor 975 may be comprised of one or more physical processing devices as components of one or more physical electronic devices.

In some implementations, the memory is configured to store data organized into modules. The stored data in each module defines instructions that configure processor 975 to perform operations. In the illustrated implementation, the memory is configured to store a network routing rule management module 960, an entity determination module 965, a notification module 970, and a network path determination module 972.

The notification module 970 includes instructions that configure processor 875 to receive or transmit notifications. For example, in some aspects, instructions in the notification module 970 may configure processor 975 to perform one or more of the functions discussed above with respect to blocks 905 and/or 940 of FIG. 9A.

The network routing rule management module 965 includes instructions that configure the processor 975 to manage routing rules. For example, in some aspects, the instructions of the network routing rule management module 965 may configure processor 975 to perform one or more functions discussed above with respect to blocks 915-925 of FIG. 9A.

The entity determination module 960 includes instructions that configure the processor 975 to determine an entity. For example, in some aspects, instructions in the entity determination module 960 may configure processor 975 to perform one or more functions discussed above with respect to blocks 910 and/or block 935 of FIG. 9A.

The network path determination module 972 includes instructions that configure the processor 975 to determine a network path towards a source node. For example, in some aspects, instructions in the network path determination module 972 may configure processor 975 to perform one or more functions discussed above with respect to block 930 of FIG. 9A. Some implementations of apparatus 950 may include one or more components of apparatus 300 of FIG. 3, 600 of FIG. 6, apparatus 750 of FIG. 7B, or apparatus 850 of FIG. 8B.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. The word "exemplary" is used exclusively herein to mean "serving as an example, instance, or illustration." Any implementation described herein as "exemplary" is not necessarily to be construed as preferred or advantageous over other implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the IMOD as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

We claim:

1. A method of managing undesirable network traffic transmitted from a source node to a destination node over a communications network, comprising:

receiving, by a computing device, a first notification of a routing rule change for the destination node;

determining, by a computing device, a first network entity corresponding to the destination node and indicated by the first notification;

determining, based on the first network entity, an identifier;

determining, by a computing device, a network address of a node maintaining network routing rules for the first network entity and the destination node based on the identifier and public data;

querying, by a computing device, the node maintaining network routing rules for one or more routing rules based on the network address;

receiving a response to the query from the node maintaining network routing rules;

determining, via a computing device, one or more network routing rules based on the response to the query;

applying at least one of the determined one or more network routing rules to at least one network device;

determining a network path toward the source node;

determining a network address for a device managed by a second network entity, different than the first network entity, based on the network path;

determining the second network entity based on the network path and the network address of the device managed by the second network entity;

determining, based on the second network entity, a second identifier;

determining a node maintaining network routing rules for the second network entity based on the second identifier and public data; and transmitting, by a computing device, a second notification of the routing rule change to the node maintaining network routing rules for the second network entity over the communications network.

2. The method of claim 1, wherein an applied network routing rule governs network traffic between the source and destination node.

3. The method of claim 1, wherein the public data is public Domain Name Service (DNS) data.

4. The method of claim 1, further comprising authenticating the first notification by successfully decrypting data indicated by the first notification.

5. The method of claim 1, wherein determining a network path comprises performing Internet Control Message Protocol (ICMP) source routing.

6. The method of claim 1, wherein determining a network path comprises performing a reverse Domain Name Service (DNS) lookup.

7. The method of claim 1, wherein the first notification of the routing rule change is received by a third network entity, and determining a network path is based on routing tables maintained by the third network entity.

8. The method of claim 1, wherein determining a network path is based, at least in part, on a log of packets transmitted or received over a particular network interface.

9. The method of claim 1, wherein determining the second network entity based on the network path comprises:

determining an upstream node on the network path; and determining a second node maintaining network routing rules for the upstream node on the network path, wherein the second node is maintained by the second network entity.

10. An apparatus for managing undesirable network traffic transmitted from a source node to a destination node over a communications network, comprising:

one or more hardware processors; and one or more memories, coupled to the one or more processors, wherein the one or more processors are configured to fetch instructions from the one or more memories, and the one or more memories are configured to store:

a notification module comprising processor instructions configured to receive a first notification of a routing rule change for the destination node;

an authentication module comprising processor instructions configured to:

determine a first network entity corresponding to the destination node and indicated by the first notification, determine, based on the first network entity, an identifier;

determine a network address of a node maintaining network routing rules for the first network entity and the destination node based on the identifier and public data;

query the node maintaining network routing rules for one or more routing rules based on the network address;

receive a response to the query from the node maintaining network routing rules;

determine one or more network routing rules based on the response to the query;

a network device control module comprising processor instructions configured to apply at least one of the determined one or more network routing rules to at least one network device;

a network path determination module comprising processor instructions configured to determine a network path toward the source node;

an entity determination module comprising processor instructions configured to:

determine a network address for a device managed by a second network entity, different than the first network entity, based on the network path, and determine the second network entity based on the network path and the network address of the device managed by the second network entity;

determine, based on the second network entity, a second identifier;

determine a node maintaining network routing rules for the second network entity based on the second identifier and public data; and an entity notification module comprising processor instructions configured to transmit a second notification of the routing rule change to the node maintaining network routing rules for the second network entity over the communications network.

11. The apparatus of claim 10, wherein the public data is public Domain Name Service (DNS) data.

12. An apparatus for managing undesirable network traffic transmitted from a source node to a destination node over a communications network, comprising:

means for receiving a first notification of a routing rule change for the destination node;

means for determining a first network entity corresponding to the destination node and indicated by the first notification;

means for determining, based on the first network entity, an identifier;

means for determining a network address of a node maintaining network routing rules for the first network entity and the destination node based on the identifier and public data;

means for querying the node maintaining network routing rules for one or more routing rules based on the network address;

means for receiving a response to the query from the node maintaining network routing rules;

means for determining one or more network routing rules based on the response to the query;

means for applying at least one of the determined one or more network routing rules to at least one network device;

means for determining a network path toward the source node;

means for determining a network address for a device managed by a second network entity, different than the first network entity, based on the network path;

means for determining the second network entity based on the network path and the network address of the device managed by the second network entity;

means for determining, based on the second network entity, a second identifier;

means for determining a node maintaining network routing rules for the second network entity based on the second identifier and public data; and means for transmitting, by a computing device, a second notification of the routing rule change to the node maintaining network routing rules for the second network entity over the communications network.

13. The apparatus of claim 12, wherein the public data is public Domain Name Service (DNS) data.

14. A non-transitory, computer readable medium storing instructions that when executed by a processor cause it to perform a method for managing undesirable network traffic transmitted from a source node to a destination node over a communications network, the method comprising:
   receiving a first notification of a routing rule change for the destination node;
   determining a first network entity corresponding to the destination node and indicated by the first notification;
   determining, based on the first network entity, an identifier;
   determining a network address of a node maintaining network routing rules for the first network entity and the destination node based on the identifier and public data;
   querying the node maintaining network routing rules for one or more routing rules based on the network address;
   receiving a response to the query from the node maintaining network routing rules;
   determining one or more network routing rules based on the response to the query;
   applying at least one of the determined one or more network routing rules to at least one network device;
   determining a network path toward the source node;
   determining a network address for a device managed by a second network entity, different than the first network entity, based on the network path;
   determining the second network entity based on the network path and the network address of the device managed by the second network entity;
   determining, based on the second network entity, a second identifier;
   determining a node maintaining network routing rules for the second network entity based on the second identifier and public data; and
   transmitting, by a computing device, a second notification of the routing rule change to the node maintaining network routing rules for the second network entity over the communications network.

15. The non-transitory, computer readable medium of claim 14, wherein the public data is public Domain Name Service (DNS) data.

* * * * *